(12) United States Patent
Nassi et al.

(10) Patent No.: US 11,907,768 B2
(45) Date of Patent: Feb. 20, 2024

(54) ENTANGLEMENT OF PAGES AND GUEST THREADS

(71) Applicant: Hewlett Packard Enterprise Development LP, Spring, TX (US)

(72) Inventors: Isaac R. Nassi, Los Gatos, CA (US); David P. Reed, Needham, MA (US); Mark Hill, Los Altos, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 160 days.

(21) Appl. No.: 17/028,874

(22) Filed: Sep. 22, 2020

(65) Prior Publication Data

US 2021/0011777 A1    Jan. 14, 2021

Related U.S. Application Data

(63) Continuation of application No. 16/116,654, filed on Aug. 29, 2018, now Pat. No. 10,817,347.

(60) Provisional application No. 62/553,005, filed on Aug. 31, 2017.

(51) Int. Cl.
*G06F 9/455* (2018.01)
*G06F 9/50* (2006.01)
*G06F 9/30* (2018.01)
*G06F 9/38* (2018.01)

(52) U.S. Cl.
CPC .......... *G06F 9/5077* (2013.01); *G06F 9/3009* (2013.01); *G06F 9/30123* (2013.01); *G06F 9/3836* (2013.01); *G06F 9/45558* (2013.01); *G06F 2009/4557* (2013.01); *G06F 2009/45583* (2013.01)

(58) Field of Classification Search
CPC ..................................................... G06F 9/5077
USPC ............................................................ 718/1
See application file for complete search history.

(56) References Cited

U.S. PATENT DOCUMENTS

| | | |
|---|---|---|
| 5,055,999 A | 10/1991 | Frank et al. |
| 5,109,486 A | 4/1992 | Seymour |
| 5,230,069 A | 7/1993 | Brelsford et al. |
| 5,247,673 A | 9/1993 | Costa et al. |
| 5,745,778 A | 4/1998 | Alfieri |
| 5,960,461 A | 9/1999 | Frank et al. |

(Continued)

FOREIGN PATENT DOCUMENTS

| | | |
|---|---|---|
| CN | 1577294 A | 2/2005 |
| EP | 0322117 A2 | 6/1989 |

(Continued)

OTHER PUBLICATIONS

C. Gordon Bell, "Multis: A New Class of Multiprocessor Computers", Science, vol. 228, pp. 462-467, Apr. 26, 1985.

(Continued)

*Primary Examiner* — Mehran Kamran
(74) *Attorney, Agent, or Firm* — Trop, Pruner & Hu, P.C.

(57) ABSTRACT

Entanglement of pages and threads is disclosed. An indication is received of a stalling event caused by a requested portion of memory being inaccessible. It is determined that the requested portion of memory is an entangled portion of memory that is entangled with a physical node in a plurality of physical nodes. A type of the entangled portion of memory is determined. The stalling event is handled based at least in part on the determined type of the entangled portion of memory.

17 Claims, 9 Drawing Sheets

(56) References Cited

U.S. PATENT DOCUMENTS

| | | |
|---|---|---|
| 5,991,893 A | 11/1999 | Snider |
| 6,016,542 A | 1/2000 | Gottleib et al. |
| 6,026,472 A | 2/2000 | James |
| 6,035,378 A | 3/2000 | James |
| 6,105,053 A | 8/2000 | Kimmel et al. |
| 6,247,109 B1 | 6/2001 | Kleinsorge et al. |
| 6,266,745 B1 | 7/2001 | De et al. |
| 6,336,170 B1 | 1/2002 | Dean et al. |
| 6,601,083 B1 | 7/2003 | Reznak |
| 6,625,709 B2 | 9/2003 | Aiken et al. |
| 6,658,447 B2 | 12/2003 | Cota-Robles |
| 6,748,593 B1 | 6/2004 | Brenner et al. |
| 6,799,202 B1 | 9/2004 | Hankinson et al. |
| 6,804,766 B1 | 10/2004 | Noel et al. |
| 6,807,616 B1 | 10/2004 | McGrath et al. |
| 6,823,472 B1 | 11/2004 | Dekoning et al. |
| 7,222,221 B1 | 5/2007 | Agesen et al. |
| 7,308,498 B1 | 12/2007 | Olsen et al. |
| 7,328,371 B1 | 2/2008 | Kalyanasundharam et al. |
| 7,596,654 B1 | 9/2009 | Wong |
| 7,613,882 B1 | 11/2009 | Akkawi |
| 7,685,391 B1* | 3/2010 | Cholleti ............... G06F 9/52 711/163 |
| 7,711,789 B1 | 5/2010 | Jnagal |
| 7,715,400 B1 | 5/2010 | Krakirian |
| 7,782,869 B1 | 8/2010 | Chitlur Srinivasa |
| 7,783,788 B1 | 8/2010 | Quinn |
| 7,797,375 B2 | 9/2010 | Vincent |
| 7,802,073 B1 | 9/2010 | Cheng et al. |
| 7,844,709 B2 | 11/2010 | Aman et al. |
| 7,852,786 B2 | 12/2010 | Wang et al. |
| 7,865,895 B2 | 1/2011 | Anand et al. |
| 7,934,035 B2* | 4/2011 | Miloushev ............. G06F 13/00 710/244 |
| 8,032,875 B2 | 10/2011 | Kosche |
| 8,090,914 B2 | 1/2012 | Tierney et al. |
| 8,156,288 B2 | 4/2012 | Karamcheti et al. |
| 8,307,191 B1* | 11/2012 | Jain ................... G06F 12/1036 711/202 |
| 8,346,909 B2 | 1/2013 | Dan et al. |
| 8,413,161 B2 | 4/2013 | Blackburn et al. |
| 8,423,694 B2 | 4/2013 | Naylor |
| 8,424,010 B2 | 4/2013 | Stegaru et al. |
| 8,521,685 B1 | 8/2013 | Chatterjee et al. |
| 8,544,004 B2 | 9/2013 | Fultheim et al. |
| 8,547,840 B1 | 10/2013 | Kumar et al. |
| RE44,610 E | 11/2013 | Krakirian |
| 8,650,296 B1 | 2/2014 | Herington et al. |
| RE44,818 E | 3/2014 | Jnagal |
| 8,693,391 B2 | 4/2014 | Garcia-Martin et al. |
| 8,776,050 B2 | 7/2014 | Plouffe |
| 8,788,672 B2 | 7/2014 | Heller, Jr. |
| 8,832,692 B2 | 9/2014 | Fultheim et al. |
| 9,020,801 B2 | 4/2015 | Fultheim et al. |
| 9,191,435 B2 | 11/2015 | Nassi |
| 9,201,689 B2 | 12/2015 | Scott et al. |
| 9,286,104 B1 | 3/2016 | Ghosh et al. |
| 9,372,752 B2 | 6/2016 | Das et al. |
| 9,552,233 B1 | 1/2017 | Tsirkin et al. |
| 9,774,401 B1 | 9/2017 | Borrill |
| 10,187,452 B2* | 1/2019 | Nassi ..................... H04L 67/10 |
| 10,353,736 B2 | 7/2019 | Nassi et al. |
| 10,812,408 B1 | 10/2020 | Dhoolam et al. |
| 10,817,347 B2* | 10/2020 | Nassi ..................... G06F 9/3009 |
| 2001/0056456 A1 | 12/2001 | Cota-Robles |
| 2002/0087611 A1 | 7/2002 | Tanaka et al. |
| 2002/0129128 A1 | 9/2002 | Gold et al. |
| 2002/0166031 A1 | 11/2002 | Chen et al. |
| 2003/0009641 A1 | 1/2003 | Arimilli et al. |
| 2003/0037185 A1 | 2/2003 | Davis et al. |
| 2003/0217234 A1 | 11/2003 | Rowlands |
| 2004/0151018 A1 | 8/2004 | Chen et al. |
| 2004/0226026 A1 | 11/2004 | Glass et al. |
| 2004/0249947 A1 | 12/2004 | Novaes |
| 2005/0015430 A1 | 1/2005 | Rothman et al. |
| 2005/0039180 A1 | 2/2005 | Fultheim et al. |
| 2005/0044301 A1 | 2/2005 | Vasilevsky |
| 2005/0193169 A1* | 9/2005 | Ahluwalia .......... G06F 12/1009 711/115 |
| 2005/0223382 A1 | 10/2005 | Lippett |
| 2006/0037017 A1 | 2/2006 | Accapadi et al. |
| 2006/0136653 A1 | 6/2006 | Traut et al. |
| 2006/0143350 A1* | 6/2006 | Miloushev ............. G06F 9/5072 710/242 |
| 2006/0242389 A1 | 10/2006 | Browning et al. |
| 2006/0259818 A1 | 11/2006 | Howell et al. |
| 2007/0094310 A1 | 4/2007 | Passey et al. |
| 2007/0186054 A1 | 8/2007 | Kruckemyer et al. |
| 2007/0226795 A1 | 9/2007 | Conti et al. |
| 2007/0283125 A1 | 12/2007 | Manczak et al. |
| 2007/0288718 A1* | 12/2007 | Cholleti .............. G06F 12/0223 711/170 |
| 2007/0288720 A1* | 12/2007 | Cholleti .................... G06F 9/52 711/202 |
| 2008/0005495 A1* | 1/2008 | Lowe .................. G06F 12/1081 711/E12.067 |
| 2008/0028408 A1 | 1/2008 | Day et al. |
| 2008/0109876 A1 | 5/2008 | Hitomi et al. |
| 2008/0270659 A1 | 10/2008 | Grewal et al. |
| 2009/0037585 A1* | 2/2009 | Miloushev ............. G06F 13/00 709/226 |
| 2009/0064158 A1 | 3/2009 | Carter |
| 2009/0138887 A1 | 5/2009 | Uehara et al. |
| 2009/0172690 A1 | 7/2009 | Zimmer et al. |
| 2009/0187904 A1 | 7/2009 | Serebrin et al. |
| 2009/0193122 A1 | 7/2009 | Krishamurthy |
| 2009/0199177 A1 | 8/2009 | Edwards et al. |
| 2009/0217276 A1 | 8/2009 | Brenner et al. |
| 2009/0288087 A1 | 11/2009 | Ringseth et al. |
| 2009/0320022 A1* | 12/2009 | Ries ..................... G06F 9/5033 718/100 |
| 2010/0031254 A1 | 2/2010 | Chin et al. |
| 2010/0161908 A1 | 6/2010 | Nation et al. |
| 2010/0235847 A1 | 9/2010 | Brehmer et al. |
| 2010/0241785 A1 | 9/2010 | Chen et al. |
| 2011/0004729 A1 | 1/2011 | Akkawi |
| 2011/0004732 A1 | 1/2011 | Krakirian |
| 2011/0004733 A1 | 1/2011 | Krakirian |
| 2011/0010709 A1 | 1/2011 | Anand et al. |
| 2011/0041131 A1 | 2/2011 | Srivatsa et al. |
| 2011/0083134 A1 | 4/2011 | Song et al. |
| 2011/0087822 A1 | 4/2011 | Bennett et al. |
| 2011/0119422 A1 | 5/2011 | Grouzdev |
| 2011/0179132 A1 | 7/2011 | Mayo et al. |
| 2011/0179229 A1 | 7/2011 | Chen et al. |
| 2011/0191783 A1 | 8/2011 | Le Moal |
| 2011/0247000 A1 | 10/2011 | Eidus et al. |
| 2011/0277038 A1* | 11/2011 | Sahita ................. G06F 21/6281 718/1 |
| 2011/0296406 A1 | 12/2011 | Bhandari et al. |
| 2012/0020370 A1 | 1/2012 | Sonnier et al. |
| 2012/0023311 A1 | 1/2012 | Yamamoto et al. |
| 2012/0054762 A1* | 3/2012 | Moon .................... G06F 9/5077 718/103 |
| 2012/0079232 A1 | 3/2012 | Hinton et al. |
| 2012/0096462 A1 | 4/2012 | Kim |
| 2012/0117299 A1* | 5/2012 | Waldspurger ......... G06F 12/122 711/E12.071 |
| 2012/0174097 A1 | 7/2012 | Levin |
| 2012/0185866 A1 | 7/2012 | Couvee et al. |
| 2012/0215990 A1* | 8/2012 | Li ...................... G06F 12/0806 711/147 |
| 2012/0239825 A1 | 9/2012 | Xia et al. |
| 2012/0272029 A1 | 10/2012 | Zhang |
| 2012/0297163 A1 | 11/2012 | Breternitz et al. |
| 2012/0303799 A1 | 11/2012 | Hadas et al. |
| 2013/0097613 A1* | 4/2013 | Shin .................... G06F 11/3466 718/108 |
| 2013/0159997 A1 | 6/2013 | Cawlfield et al. |
| 2013/0167146 A1 | 6/2013 | Dong et al. |
| 2013/0173806 A1 | 7/2013 | Newton et al. |
| 2013/0179897 A1 | 7/2013 | Archer et al. |
| 2013/0263138 A1 | 10/2013 | Aho et al. |

(56) References Cited

U.S. PATENT DOCUMENTS

| | | | |
|---|---|---|---|
| 2013/0332778 A1 | 12/2013 | Spracklen | |
| 2014/0059110 A1* | 2/2014 | Nassi | G06F 9/455 709/201 |
| 2014/0059543 A1* | 2/2014 | Nassi | H04L 67/10 718/1 |
| 2014/0081918 A1 | 3/2014 | Srivas et al. | |
| 2014/0082145 A1 | 3/2014 | Lacapra | |
| 2014/0115601 A1* | 4/2014 | Suzuki | G06F 9/544 718/104 |
| 2014/0201421 A1 | 7/2014 | Schoenberg | |
| 2014/0201477 A1 | 7/2014 | Greenfield | |
| 2014/0237192 A1* | 8/2014 | Liu | G06F 12/0833 711/135 |
| 2014/0244891 A1 | 8/2014 | Tsirkin et al. | |
| 2014/0245294 A1 | 8/2014 | Kaul | |
| 2014/0245295 A1 | 8/2014 | Tsirkin et al. | |
| 2014/0245304 A1* | 8/2014 | Zheng | G06F 9/4881 718/1 |
| 2014/0245444 A1 | 8/2014 | Lutas et al. | |
| 2014/0337393 A1 | 11/2014 | Burchall et al. | |
| 2015/0013008 A1 | 1/2015 | Lukacs et al. | |
| 2015/0033228 A1* | 1/2015 | Lee | G06F 9/526 718/1 |
| 2015/0052287 A1* | 2/2015 | Venkatasubramanian | G06F 12/084 711/6 |
| 2015/0058863 A1 | 2/2015 | Karamanolis et al. | |
| 2015/0127895 A1 | 5/2015 | Malwankar | |
| 2015/0161048 A1 | 6/2015 | Patil et al. | |
| 2015/0277908 A1 | 10/2015 | Bradbury et al. | |
| 2015/0309830 A1 | 10/2015 | Cawlfield et al. | |
| 2015/0356125 A1 | 12/2015 | Golander et al. | |
| 2016/0088327 A1 | 3/2016 | Cronk et al. | |
| 2016/0127492 A1 | 5/2016 | Malwankar et al. | |
| 2016/0269313 A1 | 9/2016 | Brooker et al. | |
| 2016/0366183 A1 | 12/2016 | Smith et al. | |
| 2017/0031819 A1 | 2/2017 | Venkatasubramanian et al. | |
| 2017/0149921 A1* | 5/2017 | Nassi | H04L 67/10 |
| 2017/0249255 A1 | 8/2017 | Edwards | |
| 2017/0371561 A1 | 12/2017 | Cai | |
| 2018/0060103 A1* | 3/2018 | Tsirkin | G06F 9/45545 |
| 2018/0062764 A1 | 3/2018 | Borrill | |
| 2018/0150232 A1* | 5/2018 | Tsirkin | G06F 9/45558 |
| 2018/0217859 A1* | 8/2018 | Triplett | G06F 9/45558 |
| 2019/0370049 A1* | 12/2019 | Gopalan | G06F 9/45558 |

FOREIGN PATENT DOCUMENTS

| | | |
|---|---|---|
| GB | 2419701 A | 5/2006 |
| JP | 2004-355124 A | 12/2004 |
| WO | 2015/034506 A1 | 3/2015 |
| WO | 2015/034508 A1 | 3/2015 |

OTHER PUBLICATIONS

Carl J. Young. Extended Architecture and Hypervisor Performance. IBM VM/370 Development Group. Published In: Proceedings of the workshop on virtual computer systems. pp. 177-183 Cambridge, Massachusetts, USA—Mar. 26-27, 197. ACM New York, NY, USA © 1973.
Chapman et al., "vNUMA: A Virtual Shared-Memory Multiprocessor", 2009.
Chen et al., "When Virtual Is Better Than Real", 2001.
Chester Gordon Bell. Three Decades of Multiprocessors. Feb. 1991.
Chester Gordon Bell. Darpa Proposal: Encore Computer Corporation Research and Development in High Performance and Fail Soft Multiprocessors for Parallelism; and Systolic Array Processors for Signal Processing. Mar. 10, 1984.
Corbató et al., "Introduction and Overview of the Multics System", 1965.
Corbató et al., "Multics—The first seven years", Spring Joint Computer Conference, 1972.
Dave Taylor. Distributed Operating Systems—An Overview of Current Research. Jun. 13, 1998.
David B. Gustavson, "Applications for the Scalable Coherent Interface", Stanford Linear Accelerator Center, Apr. 1990.
David B. Gustavson. [RPRWG] Dave James. Jan. 18, 2008.
David J. Schanin. The Design and Development of a Very High Speed System Bus—The Encore Multimax Nanobus. IEEE, 1986.
Edmnd Burke. An Overview of System Software for the KSR1. Kendall Square Research Corporation, Waltham, MA. IEEE. 1993.
Einar Rustad, "numascale: NumaConnect", Sep. 2013.
Elizabeth Corcoran, "Strategic computing: a status report", Apr. 1987.
Frank et al. The KSR1: Bridging the Gap Between Shared Memory and MPPs. IEEE, 1993.
Fraser et al. 3Leaf Virtual Server Software Architecture. Copyright (c) 2004 3Leaf Networks.
Fu et al., "Distributed shared arrays: A distributed virtual machine with mobility support for reconfiguration", Wayne State University, Sep. 1, 2003.
Gabriel Southern. Analysis of SMP VM CPU Scheduling. George Mason University. 2008.
Gardner Hendrie, "Oral History of Gordon Bell", Computer History Museum, Jun. 23, 2005.
Gertner et al., "Symmetric Parallel Processing", 1990.
Ghormley et al., "GLUnix: a Global Layer Unix for a Network of Workstations", University of California at Berkeley, Aug. 14, 1997.
Giloi W.K., Hastedt C., Schoen F., Schroeder-Preikschat W. (1991) A distributed implementation of shared virtual memory with strong and weak coherence. In: Bode A. (eds) Distributed Memory Computing. EDMCC 1991. Lecture Notes in Computer Science, vol. 487. Springer, Berlin, Heidelberg.
Goodman et al. Scalability and Its Application to Multicube. Computer Sciences Technical Report #835. Mar. 1989.
Gordon Bell, "Scalable, Parallel Computers: Alternatives, Issues, and Challenges", International Journal of Parallel Programming, vol. 22, No. 1, 1994.
Govil et al., "Cellular Disco: resource management using virtual clusters on shared-memory multiprocessors", 17th ACM Symposium on Operating Systems Principles, Dec. 1999.
Gregory F. Pfister, "An Introduction to the InfiniBand Architecture", 2001.
Gregory F. Pfister. In Search of Clusters The Ongoing Battle in Lowly Parallel Computing. Chapters. 6-7, 11, 12.11.4.2, 13. Second Edition. (c) 1998 Prentice Hall PTR. 1998 (part 1 of 3).
Gregory F. Pfister. In Search of Clusters The Ongoing Battle in Lowly Parallel Computing. Chapters. 6-7, 11, 12.11.4.2, 13. Second Edition. (c) 1998 Prentice Hall PTR. 1998 (part 2 of 3).
Gregory F. Pfister. In Search of Clusters The Ongoing Battle in Lowly Parallel Computing. Chapters. 6-7, 11, 12.11.4.2, 13. Second Edition. (c) 1998 Prentice Hall PTR. 1998 (part 3 of 3).
Gregory Pfister, "Aspects of the InfiniBand Architecture", IBM Server Technology & Architecture, Austin, TX, Oct. 11, 2001.
Healy et al. Single System Image: A Survey. Article in Journal of Parallel and Distributed Computing. Feb. 2016.
History of IBM Mainframe Operating Systems. From Wikipedia, the free encyclopedia. https://web.archive.org/web/20120622012058/ https://en.wikipedia.org/wiki/History_of_IBM_mainframe_operating_systems. Jun. 22, 2012.
Holley et al., "VM/370 asymmetric multiprocessing", IBM Systems Journal, vol. 18, No. 1, 1979.
Hu et al. The Memory and Communication Subsystem of Virtual Machines for Cluster Computing. Jan. 2002.
Hudzia et al., "Memory Aggregation for KVM", Hecatonchire Project, Nov. 2012.
Hwang et al. Distributed and Cloud Computing From Parallel Processing to the Internet of Things. Oct. 17, 2011.
Ion Stoica. Virtual Machines Disco and Xen (Lecture 10, cs262a). UC Berkeley, Sep. 28, 2016.
J. F. Keeley. An Application-Oriented Multiprocessing System: I Introduction. IBM Systems Journal, vol. 6, No. 2. 1967, part 1.
Janjua et al. CEJVM: "Cluster Enabled Java Virtual Machine". Faculty of Computer Science & Engineering, GIK Institute, Topi, Pakistan. IEEE, Sep. 2002.

(56) References Cited

OTHER PUBLICATIONS

Jeff Dike. User Mode Linux. Bruce Peren's Open Source Series. Chapter 12. Copyright (c) 2006 Pearson Education, Inc. Apr. 2006.
Jeff Dike. UML Clustering. Sep. 14, 2001.
Jiang et al., "SODA: a Service-On-Demand Architecture for Application Service Hosting Utility Platforms", Proceedings of the 12th IEEE International Symposium on High Performance Distributed Computing (HPDC'03), 2003.
Jim Elliot. IBM Mainframes—45+ Years of Evolution. (c) 2010 IBM Corporation. 2010.
Juhász et al., "Distributed and Parallel Systems: Cluster and Grid Computing", the Kluwer international series in engineering and computer science, 2005.
Kai Hwang. Advanced Computer Architecture: Parallelism, Scalability, Programmability. Chapter 7. Copyright (c) 1993 McGraw-Hill, Inc.
Kaneda et al. A Virtual Machine Monitor for Providing a Single System Image. 2006.
King et al., "Operating System Support for Virtual Machines", Proceedings of the 2003 USENIX Technical Conference, 2003.
Konthothanassis et al., "VM-Based Shared Memory on Low-Latency, Remote-Memory-Access Networks", Nov. 1996.
Kronenberg et al., "VAXclusters: A Closely-Coupled Distributed System", ACM Transactions on Computer Systems, vol. 4, No. 2, pp. 130-146, May 1986.
AlnÆs et al., "Scalable Coherent Interface", Jan. 1990.
Ami Litman, "The DUNIX Distributed Operating System", Jan. 1988.
Amza et al., "TreadMarks: Shared Memory Computing on Networks of Workstations", 1996.
Amza et al., "TreadMarks: Shared Memory Computing on Networks of Workstations", Feb. 1996.
Andrew W. Wilson Jr., "Hierarchical Cache / Bus Architecture for Shared Memory Multiprocessors", 1987.
Andrew Wilkins Wilson Jr., "Organization and Statistical Simulation of Hierarchical Multiprocessors", Department of Electrical and Computer Engineering, Carnegie-Mellon University, Aug. 1985. (part 1 of 4).
Andrew Wilkins Wilson Jr., "Organization and Statistical Simulation of Hierarchical Multiprocessors", Department of Electrical and Computer Engineering, Carnegie-Mellon University, Aug. 1985. (part 2 of 4).
Andrew Wilkins Wilson Jr., "Organization and Statistical Simulation of Hierarchical Multiprocessors", Department of Electrical and Computer Engineering, Carnegie-Mellon University, Aug. 1985. (part 3 of 4).
Andrew Wilkins Wilson Jr., "Organization and Statistical Simulation of Hierarchical Multiprocessors", Department of Electrical and Computer Engineering, Carnegie-Mellon University, Aug. 1985. (part 4 of 4).
Aral et al. Process Control Structures for Multiprocessors. Encore Computer Corporation. IEEE, 1991.
Aral, Ziya et al. "Variable Weight Processes with Flexible Shared Resources?." (1989).
Assaf Schuster, Resume, Jul. 2017.
Author Unknown, "A research and development strategy for high performance computing", Executive Office of the President, Office of Science and Technology Policy, Nov. 20, 1987.
Author Unknown, "IBM System/360 Model 67: Functional Characteristics", IBM Systems Reference Library, First Edition, 1967.
Author Unknown, "IBM Time Sharing System: Command System User's Guide", IBM Systems Reference Library, Aug. 1976. (1 of 3).
Author Unknown, "IBM Time Sharing System: Command System User's Guide", IBM Systems Reference Library, Aug. 1976. (2 of 3).
Author Unknown, "IBM Time Sharing System: Command System User's Guide", IBM Systems Reference Library, Aug. 1976. (3 of 3).
Author Unknown, "Multimax Technical Summary", Encore Computer Corporation, May 1985.
Author Unknown, "System/360 Model 67: Time Sharing System Preliminary Technical Summary", IBM Systems Reference Library, 1966.
Author Unknown, Technical Summary, Kendall Square Research, 1992.
Author Unknown. Features—multicians.org/features.html. Multics Software Features. Jul. 21, 2012.
Barak et al., "MOS: A Multicomputer Distributed Operating System", The Hebrew University of Jerusalem, Software—Practice and Experience, vol. 15(8), 725-737, Aug. 1985.
Beck et al. Harness: a next generation distributed virtual machine. Future Generation Computer Systems 15 (1999). pp. 571-582.
Bell et al., "The Encore Continuum: a complete distributed work station—multiprocessor computing environment", National Computer Conference, 1985.
Bendtsen et al. Experience With the KSR-1 Parallel Computer. Jul. 1996.
Bensoussan et al. The Multics Virtual Memory: Concepts and Design. Association for Computing Machinery, Inc., 1972.
Bilas et al., "Shared virtual memory clusters: bridging the cost-performance gap between SMPs and hardware DSM systems", Journal of Parallel and Distributed Computing, Oct. 19, 2001.
Blakeney et al. An Application-Oriented Multiprocessing System: II Design Characteristics of the 9020 System. IBM Systems Journal, vol. 6, No. 2. 1967, part 2.
Boykin et al. Programming under Mach. UNIX and Open Systems Series. pp. 63-97.Copyright (c) 1993 by Addison-Wesley Publishing Company, Inc. 1993.
Breit et al. Technical Applications on the KSR1: High Performance and Ease of Use. IEEE, 1993.
Bugnion et al., "Disco: Running Commodity Operating Systems on Scalable Multiprocessors", Computer Systems Laboratory, Stanford University, 1997.
Büttner et al., "Arts of Peace—A High-Performance Middleware Layer for Parallel Distributed Computing", Mar. 31, 1995.
Buyya et al., "Single System Image (SSI)", The International Journal of High Performance Computing Applications, vol. 15, No. 2, 2001.
Buzen et al., "The evolution of virtual machine architecture", Honeywell Information Systems, Inc. and Harvard University, National Computer Conference, 1973.
Yeo C.S., Buyya R., Pourreza H., Eskicioglu R., Graham P., Sommers F. (2006) Cluster Computing: High-Performance, High-Availability, and High-Throughput Processing on a Network of Computers. In: Zomaya A.Y. (eds) Handbook of Nature-Inspired and Innovative Computing. Springer, Boston, MA. 2006.
Younge et al. Evaluation of SMP Shared Memory Machines for Use With In- Memory and OpenMP Big Data Applications. 2016 IEEE International Parallel and Distributed Processing Symposium Workshops. 2016.
Zhu et al., "JESSICA2: A Distributed Java Virtual Machine with Transparent Thread Migration Support", The University of Hong Kong, 2002.
Lenoski et al. The Stanford Dash Multiprocessor. IEEE, Mar. 1992.
Li et al., "Memory Coherence in Shared Virtual Memory Systems", ACM Transactions on Computer Systems, vol. 7, No. 4, pp. 321-359, Nov. 1989.
Li et al., "Memory Coherence in Shared Virtual Memory Systems", Distributed Information Processing, 2014.
Li et al., "Memory Coherence in Shared Virtual Memory Systems", Yale University, 1986.
Liu et al., "Design and Implementation of a Single System Image Operating System for Ad Hoc Networks", Department of Computer Science, Cornell University, Jun. 2005.
Ma et al., "JESSICA: Java-Enable Single-System-Image Computing Architecture", The University of Hong Kong, Oct. 2000.
Maurice Herlihy. Wait-Free Synchronization. ACM Transactions on Programming Languages and Systems, vol. 11, No. 1. pp. 124-149. Jan. 1991.
Michael James Carlton, "Multiple-Bus, Scaleable, Shared-Memory Multiprocessors", University of California at Berkeley, 1995.

(56) References Cited

OTHER PUBLICATIONS

Michael T. Alexander, "Organization and features of the Michigan terminal system", Spring Joint Computer Conference, 1972.
Oracle. Oracle Buys Virtual Iron—Adds advanced virtualization management technology to enhance Oracle VM. Jun. 15, 2009.
Osisek et al. ESA/390 Interpretive-Execution Architecture, Foundation for VM/ESA. IBM Systems Journal, vol. 30, No. 1. Feb. 1991.
Ossanna et al. Communications and Input/Output Switching in a Multiplex Computing System. Fall Joint Computer Conference, 1965.
Peng et al. DVMM: a Distributed VMM for Supporting Single System Image on Clusters. The 9th international Conference for Young Computer Scientists. IEEE, 2008.
Pete Keleher, "CVM: The Coherent Virtual Machine", University of Maryland, Aug. 1, 1998.
Pieter J. Muller, "An Environment for Distributed Programming on a Multicomputer", a thesis submitted to the department of computer science of the University of Stellenbosch in partial fulfillment of the requirements for the degree of master of science, Feb. 1994.
Pinkston et al., "InfiniBand: The 'De Facto' Future Standard for System and Local Area Networks or Just a Scalable Replacement for PCI Buses?", Cluster Computing 6, pp. 95-104, 2003.
Popek and Goldberg Virtualization Requirements. From Wikipedia, the free encyclopedia. https://en.wikipedia.org/wiki/Popek_and_Goldberg_virtualization_requirements. Jun. 22, 2012.
Popek et al. Formal Requirements for Virtualizable Third Generation Architectures. Communications of the ACM, vol. 17, No. 7. Jul. 1974.
Popek, Gerald J. et al. "Locus—A Network Transparent, High Reliability Distributed System." SOSP (1981).
Protić et al., "A Survey of Distributed Shared Memory Systems", Proceedings of the 28th Annual Hawaii International Conference on System Sciences, 1995.
R. A. Mackinnon, "The changing virtual machine environment: Interfaces to real hardware, virtual hardware, and other virtual machines", 1979.
R. J. Creasy. The Origin of the VM/370 Time-Sharing System. IBM J. Res. Develop. vol. 25, No. 5. Sep. 1981.
Rajkumar Buyya, "Parmon: a portable and scalable monitoring system for clusters", Monash University, 2000.
Ramachandran et al. Scalability Study of the KSR-1—Appeared in Parallel Computing, vol. 22, pp. 739-759. 1996.
Reports Leading to the National High Performance Computing Program: "A Research and Development Strategy for High Performance Computing", Nov. 1987; "The U.S. Supercomputer Industry," Dec. 1987; "The Federal High Performance Computing Program", Sep. 1989; "High Performance Computing and Communication: Investment in American Competitiveness", ("Gartner Report"), Mar. 1991. (part 1 of 3).
Reports Leading to the National High Performance Computing Program: "A Research and Development Strategy for High Performance Computing", Nov. 1987; "The U.S. Supercomputer Industry," Dec. 1987; "The Federal High Performance Computing Program", Sep. 1989; "High Performance Computing and Communication: Investment in American Competitiveness", ("Gartner Report"), Mar. 1991. (part 2 of 3).
Reports Leading to the National High Performance Computing Program: "A Research and Development Strategy for High Performance Computing", Nov. 1987; "The U.S. Supercomputer Industry," Dec. 1987; "The Federal High Performance Computing Program", Sep. 1989; "High Performance Computing and Communication: Investment in American Competitiveness", ("Gartner Report"), Mar. 1991. (part 3 of 3).
Rich Oehler, "Ideas for a Dependable 'Industry Standard Architecture' Platform", Newisys, Inc., Jan. 27, 2005.
Richard A. Jenkins, "New Approaches in Parallel Computing", Computers in Physics, 1989.
Robert P. Goldberg. Survey of Virtual Machine Research. Honeywell Information Systems and Harvard University. Jun. 1974.
Robert P. Goldberg. Survey of Virtual Machine Research (2). Honeywell Information Systems and Harvard University. Jun. 1974.
Roland et al. Strategic Computing—Darpa and the Quest for Machine Intelligence, 1983-1993. Chapter 5 and Chapter 9. (c)2002 Massachusetts Institute of Technology. 2002.
Rudolph et al., "Dynamic Decentralized Cache Schemes for MIMD Parallel Processors", Carnegie-Mellon University, 1984.
Scales et al., "Towards Transparent and Efficient Software Distributed Shared Memory", Oct. 1997.
Scott Lurndal. 3LeafVirtual Server—Low-Level Architectural Design. May 9, 2018.
Sirer et al. Distributed Virtual Machines: A System Architecture for Network Computing. Dept. of Computer Science & Engineering, University of Washington. 1998.
Southern et al. FPGA Implementation of High Throughput Circuit for Trial Division by Small Primes. George Mason University. 2007.
Brodawa et al., "An efficient virtual machine implementation", Wayne State University, National Computer Conference, 1973.
Steier et al. Mind Matters—A Tribute to Allen Newell. Chapter 6. Copyright (c) 1996 by Lawrence Associates, Inc. 1996.
Tetzlaff et al., "VM/370, Attached Processor, and multiprocessor performance study", IBM Systems Journal, vol. 23, No. 4, 1984.
Tod Newcombe, "Public-Sector Multiprocessing Emerges", Nov. 30, 1995.
USENIX Association. Proceedings of the 5th Annual Linux Showcase & Conference. Oakland, CA. Nov. 5-10, 2001.
Vasilevsky et al., "LINUX Virtualization on Virtual Iron VFe", Virtual Iron Software, Inc., 2005.
VM (operating system). From Wikipedia, the fee encyclopedia. https://en.wikipedia.org/wiki/VM_(operating_system). Jun. 22, 2012.
Walker et al. The Locus Distributed Operating System. ACM, 1983.
Walker et al. The Locus Distributed Operating System. Presentation, 1983.
Walker, Bruce J. and Douglas Steel. "Implementing a Full Single System Image UnixWare Cluster: Middleware vs Underware." PDPTA (1999).
Wang et al. NEX: Virtual Machine Monitor Level Single System Support in Xen. 2009 First International Workshop on Education Technology and Computer Science. IEEE, 2009.
Whitaker et al. Scale and Performance in the Denali Isolation Kernel. USENIX Association 5th Symposium on Operating Systems Design and Implementation. Dec. 2002.
Woodbury et al., "Shared Memory Multiprocessors: The Right Approach to Parallel Processing", Encore Computer Corporation, IEEE, 1989.
Aho et al. Principles of Optimal Page Replacement. Article in Journal of the ACM. vol. 18, No. 1, Jan. 1971.
Bell et al., "DSM Perspective: Another Point of View", Proceedings of the IEEE, vol. 87, No. 3, Mar. 1999.
Chen et al., "A Transparent Remote Paging Model forVitual Machines", Department of Computer Science and echnology at Peking University, and Department of Computer Science at Michigan Technological University, 2008.
Chris Mellor, "Flexi-Plexisto s software-defined memory roadmap", Apr. 25, 2016.
Chris Mellor, "Plexisto s latest box sounds a lot like flash memory as virtual DRAM", Jul. 27, 2015.
Chris Mellor, "Plexistor rolls out storage-defined memory for the masses", Jan. 27, 2016.
Dean et al., "MapReduce: Simplified Data Processing on Large Clusters", USENIX Association, OSDI '04: 6th Symposium on Operating Systems Design and Implementation, pp. 137-149, 2004.
Ehab S. Al-Shaer, Distributed Memory Management: Design Issues and Future Trends, Mar. 19, 1993.
Feeley et al., "Implementing Global Memory Management in a Workstation Cluster", Department of Computer Science and Engineering at University of Washington, and Chandramohan A. Thekkath DEC Systems Research Center, Dec. 1995.
Fleisch et al., Mirage: A Coherent Distributed Shared Memory Design, ACM, 1989, pp. 211-223.
Ike Nassi, "Scaling the Computer to the Problem: Application Programming with Unlimited Memory", Cover Feature Computer Design Starts Over, Aug. 2017.

(56) References Cited

OTHER PUBLICATIONS

International Search Report and Written Opinion received for PCT Patent Application No. PCT/US17/48903, dated Jan. 2, 2018, 11 pages.
International Search Report and Written Opinion received for PCT Patent Application No. PCT/US18/39835, dated Oct. 30, 2018, 8 pages.
International Search Report and Written Opinion received for PCT Patent Application No. PCT/US18/48743, dated Nov. 14, 2018, 6 pages.
Mendel Rosenblum, "The Reincarnation of Virtual Machines", Jul./Aug. 2004.
Nitzberg et al., Distributed Shared Memory: A Survey of Issues and Algorithms, 1991 IEEE, 1991.
Ousterhout et al., "The Case for RAMClouds: Scalable High-Performance Storage Entirely in DRAM" SIGOPS Operating Systems Review, vol. 43, No. 4, pp. 92-105, Dec. 2009.
PCT2013/058271, "Notification of Transmittal of the International Search Report and the Written Opinion of the International Searching Authority, or Declaration", dated Mar. 18, 2014.
PCT20131058262, "Notification of Transmittal of the International Search Report and the Written Opinion of the International Searching Authority, or Declaration", dated Mar. 25, 2014.
Peter J. Denning. The Working Set Model for Program Behavior. Massachusetts Institute of Technology, Cambridge, Massachusetts. Communications of the ACM. vol. 11, No. 5. May 1968.
Protic et al., "Distributed Shared Memory: Concepts and Systems", University of Belgrade, 1996.
Hui et al., "Study on Application of Cloud Computing Technology in Nuclear Power Plant Design Platform", Science and Technology on Reactor System Design Technology Laboratory, Jul. 2013, 4 pages.
Wikipedia, "Processor affinity", available online at <https://en_wikipedia_org/w/index.php?title=Processor_athnity&oldid=730409119>, Jul. 18, 2016, 3 pages.

* cited by examiner

ENTANGLEMENT OF PAGES AND GUEST THREADS

CROSS REFERENCE TO OTHER APPLICATIONS

This application is a continuation of U.S. patent application Ser. No. 16/116,654, entitled ENTANGLEMENT OF PAGES AND GUEST THREADS filed Aug. 29, 2018 which is incorporated herein by reference for all purposes, which claims priority to U.S. Provisional Application No. 62/553, 005, entitled ENTANGLEMENT OF PAGES AND GUEST THREADS filed Aug. 31, 2017 which is incorporated herein by reference for all purposes.

BACKGROUND OF THE INVENTION

In a distributed computing system (e.g., a large database system run on a cluster of server nodes), managing the distribution of data, both in terms of data placement and data access distribution, may be challenging. This is due to the behavior of complex computing systems changing over time, e.g., with new releases of applications, the addition of new intermediate software layers, new operating system releases, new processor models, changing structural characteristics of data, increasing amounts of data, and different data access patterns.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Described herein are techniques for entangling pages and/or threads to nodes in a computer system that spans a cluster of nodes. One example of such a computer system is referred to herein as a "software-defined server," which is described in further detail below. While example embodiments involving entanglement in a software-defined server are described herein for illustrative purposes, the entanglement mechanism described herein may be variously adapted to accommodate any other type of computer system spanning multiple nodes (e.g., a large distributed shared memory system), as appropriate. Examples of other systems whose performance is improved using the entanglement mechanism described herein include those systems that have processing elements operating on datasets in which performance is improved when the processing elements and the data elements are co-located. Such systems include databases, as well as "Internet of things (IOT)" systems.

Software-Defined Server

Figure 1:
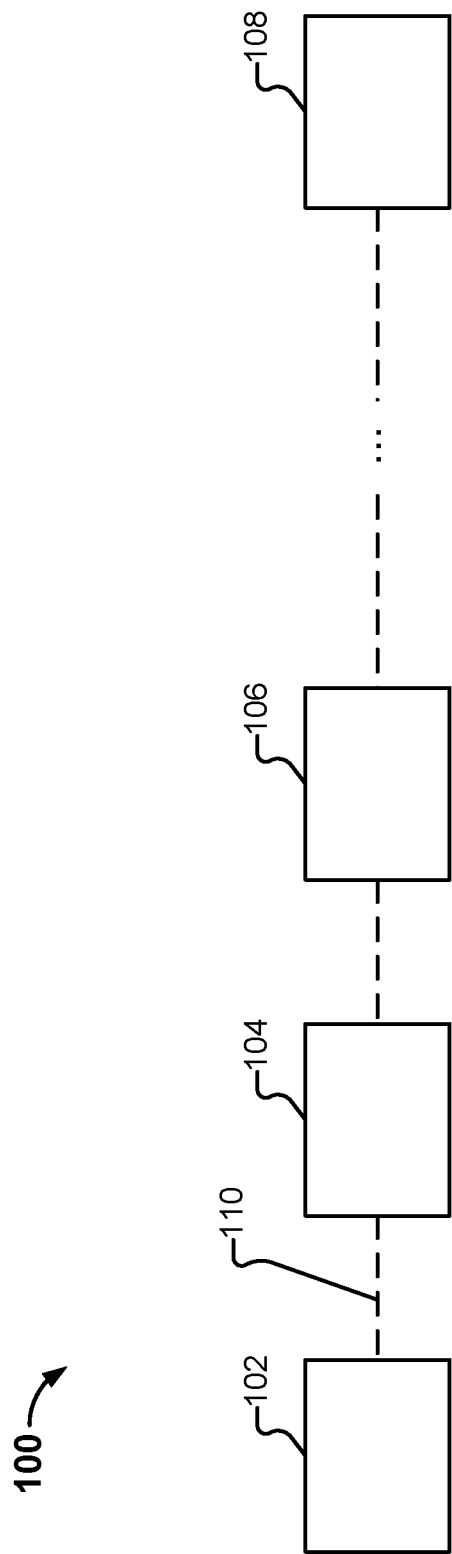
FIG. 1 illustrates an embodiment of a computer system.

FIG. 1 illustrates an embodiment of a computer system. System 100 is also referred to herein as a "software-defined server," an "enterprise supercomputer," and a "mainframe." In the example shown, system 100 includes a plurality of nodes (e.g., nodes 102-108) located in close proximity (e.g., located within the same rack or nearby racks of servers). In other embodiments, multiple racks of nodes (e.g., located within the same facility) can be used in the system. Further, the techniques described herein can also be used in conjunction with distributed systems.

The nodes are interconnected with an interconnect (110) such as 10-gigabit or 40-gigabit Ethernet, direct PCI-to-PCI, and/or InfiniBand. Each node comprises commodity server-class hardware components (e.g., a blade in a rack with its attached or contained peripherals). The interconnect may be dedicated, but need not be. The interconnect may also be high-speed, but need not be. In the example shown in FIG. 1, each node includes multiple physical processor chips. Each physical processor chip (also referred to as a "socket") includes multiple cores, and each core has multiple hyperthreads.

Figure 2:
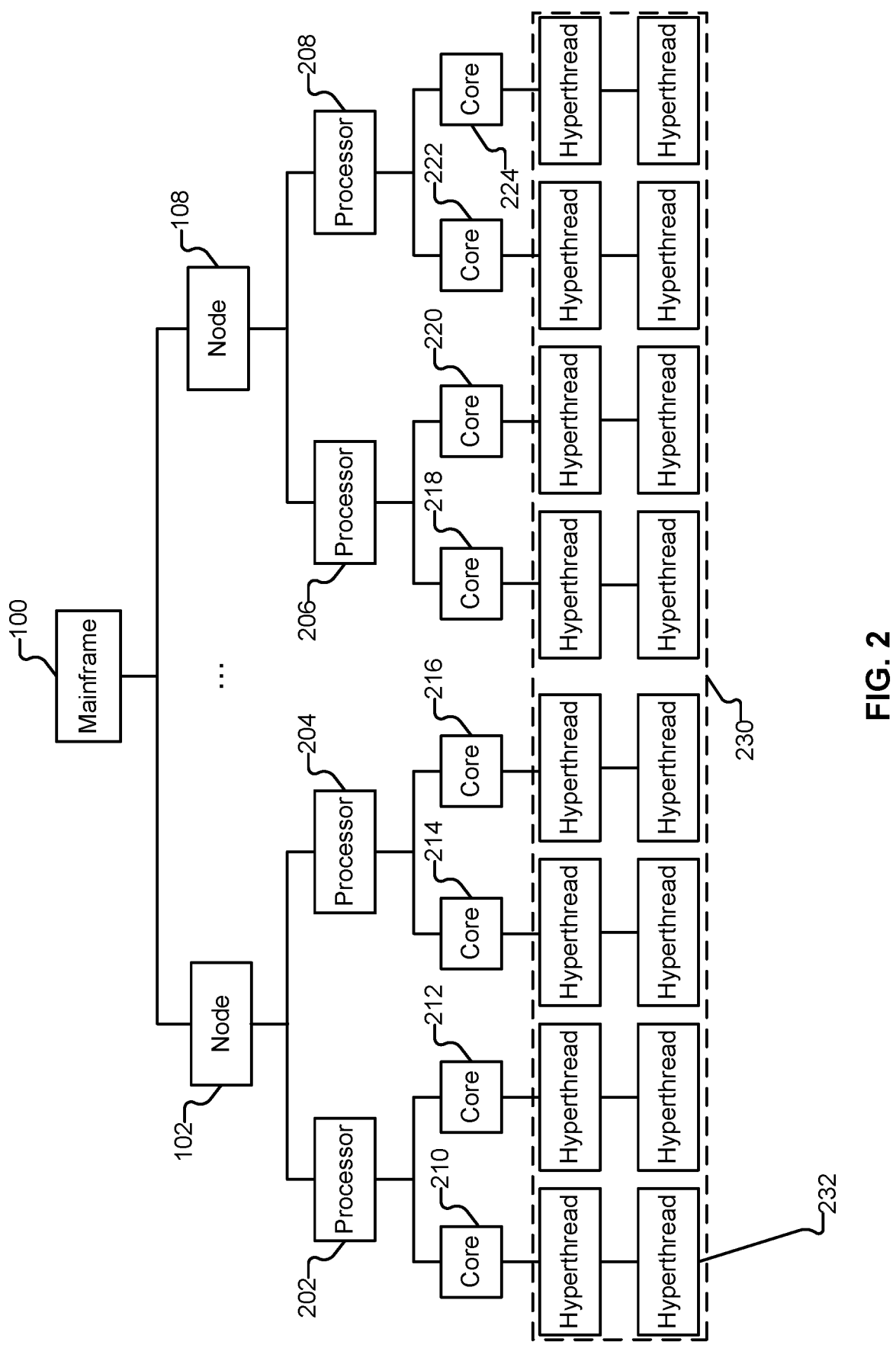
FIG. 2 illustrates the physical structure of the computer system as a hierarchy.

As illustrated in FIG. 2, the physical structure of system 100 forms a hierarchy (230) (from the bottom) of hyperthreads (232), cores (210-224), physical processor chips (202-208), and nodes (102-108 (with nodes 104, 106, etc. omitted from the figure and represented as ellipses)). The tree depicted in FIG. 2 is of a fixed size, defined by the hardware configuration.

As will be described in more detail below, each enterprise supercomputer (e.g., system 100) runs a single instance of an operating system. Both the operating system, and any applications, can be standard commercially available software and can run on system 100. In the examples described herein, the operating system is Linux, however other operating systems can also be used, such as Microsoft Windows, Mac OS X, or FreeBSD.

Figure 3A:
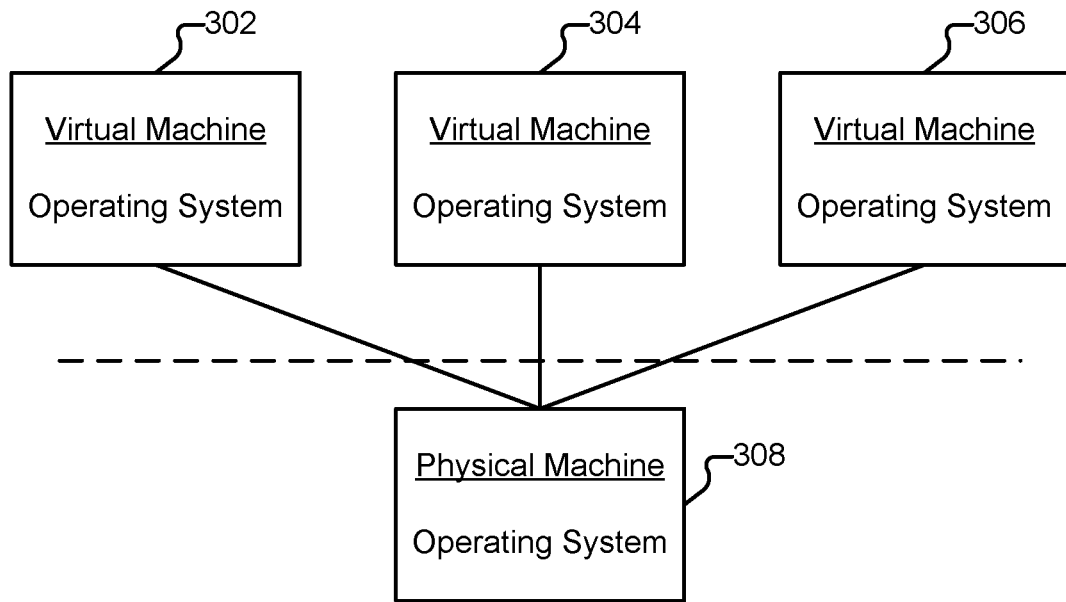
FIG. 3A depicts a virtualized computing environment in which multiple virtual machines (with respective multiple guest operating systems) run on a single physical machine.
Figure 3B:
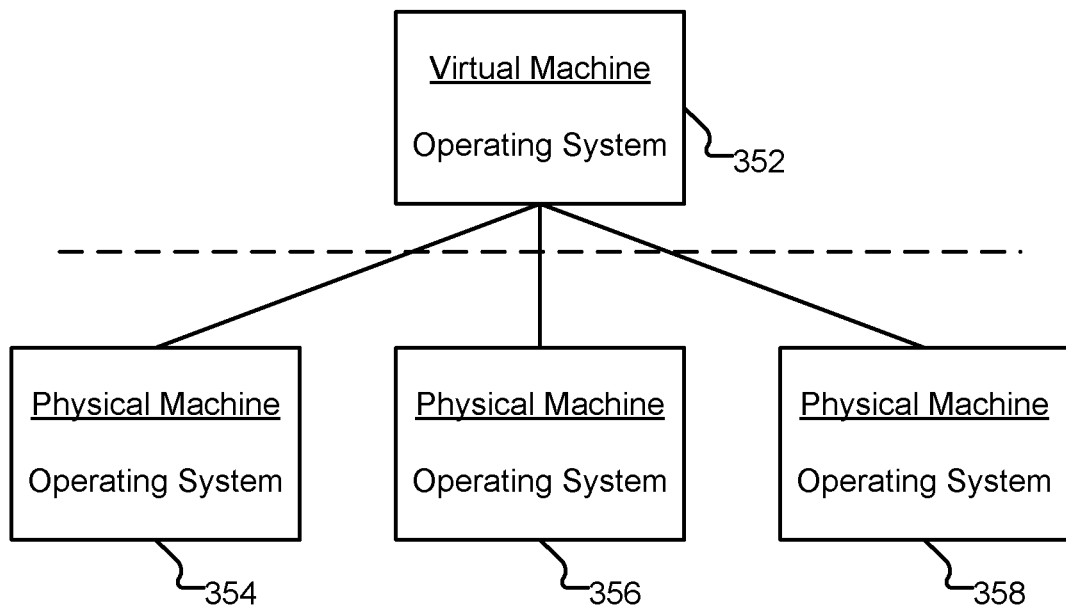
FIG. 3B depicts a virtualized computing environment in which multiple physical machines collectively run a single virtual operating system.

In a traditional virtualized computing environment, multiple virtual machines may run on a single physical machine. This scenario is depicted in FIG. 3A. In particular, three virtual machines (302-306) are running three guest operating systems on a single physical machine (308), which has its own host operating system. In contrast, using the techniques described herein, multiple physical machines (354-358) collectively run a single virtual operating system (352), as depicted in FIG. 3B.

Figure 4A:
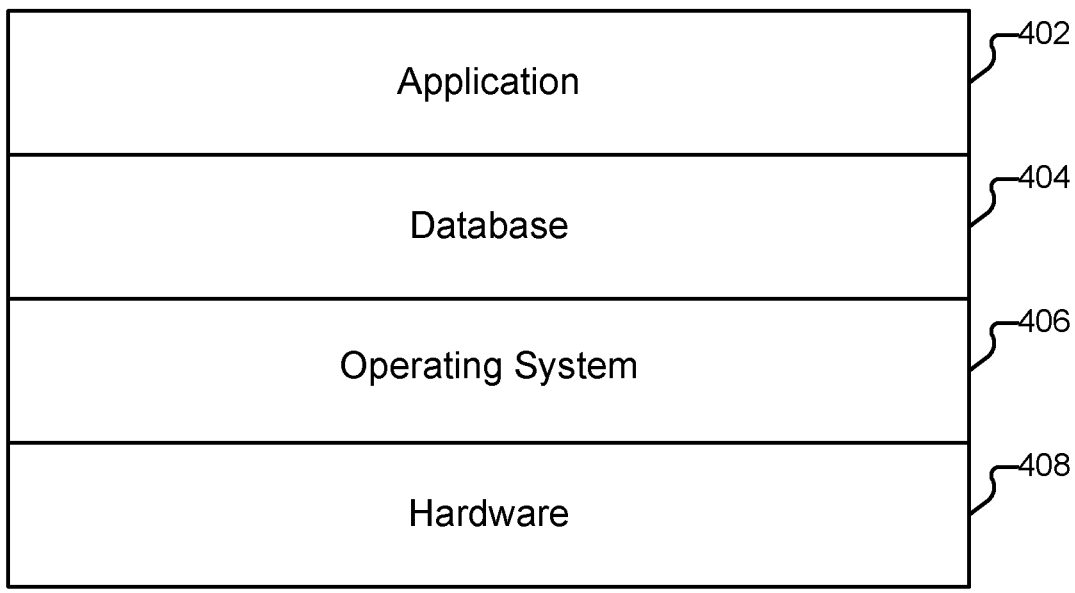
FIG. 4A depicts an example of a software stack.
Figure 4B:
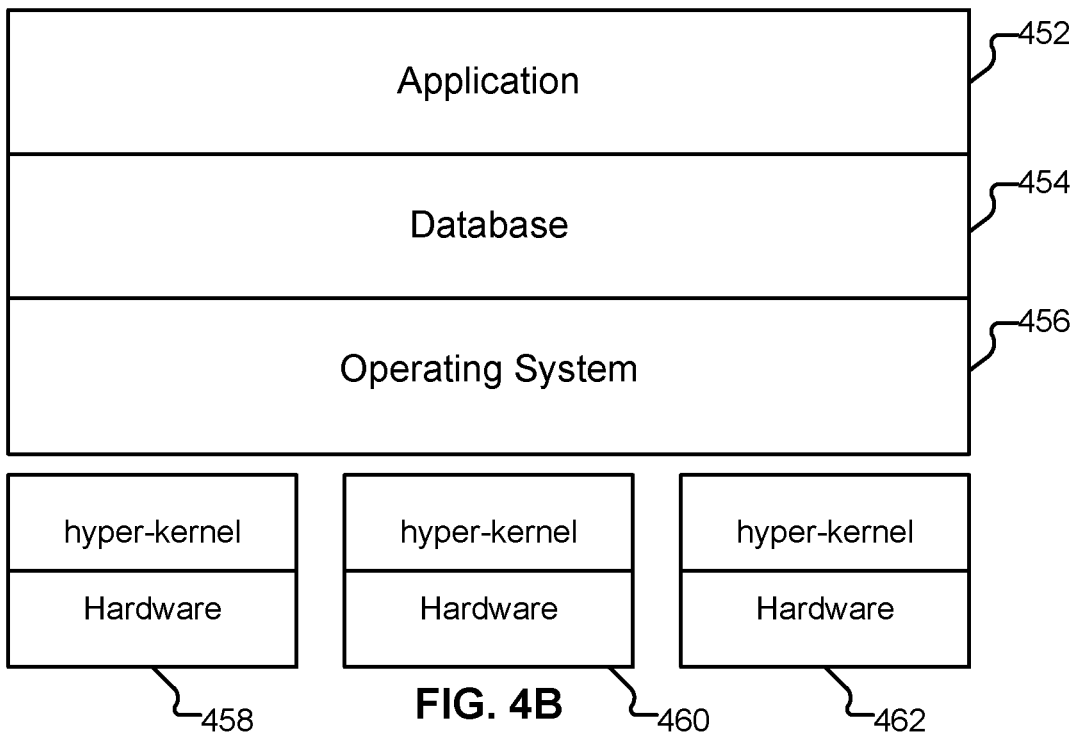
FIG. 4B depicts an example of a software stack.

One example of a software stack is depicted in FIG. 4A. Such a stack may typically be used in traditional computing environments. In the stack shown in FIG. 4A, an application (402) sits above a database engine (404), which in turn sits upon an operating system (406), underneath which lies hardware (408). FIG. 4B depicts a software stack used in some embodiments. As with the stack shown in FIG. 4A, an application (452) sits above a database engine (454), which in turn sits upon an operating system (456). However, underneath the operating system and above the hardware is a layer of software (referred to herein as a hyper-kernel) that observes the system running in real time and optimizes the system resources to match the needs of the system as it operates. The hyper-kernel (one example of a virtual machine manager) conceptually unifies the RAM, processors, and I/O (Input Output resources for example Storage, Networking resources) of a set of commodity servers, and presents that unified set to the operating system. Because of this abstraction, the operating system will have the view of a single large computer, containing an aggregated set of processors, memory, and I/O. As will be described in more detail below, the hyper-kernel optimizes use of resources. The hyper-kernel can also help optimize other I/O system resources such as networks and storage. In some embodiments, based on observations and profiles of running software, performance indicators (hints) are provided to upper layers (e.g., database management systems) about the dynamic performance of the system that can further improve overall system performance.

The hyper-kernel can be ported to all major microprocessors, memory, interconnect, persistent storage, and networking architectures. Further, as hardware technology evolves (e.g., with new processors, new memory technology, new interconnects, and so forth), the hyper-kernel can be modified as needed to take advantage of industry evolution.

As shown in FIG. 4B, operating system 456 is running collectively across a series of nodes (458-462), each of which has a hyper-kernel running on server hardware. Specifically, the operating system is running on a virtual environment that is defined by the collection of hyperkernels. As will be described in more detail below, the view for operating system 456 is that it is running on a single hardware platform that includes all of the hardware resources of the individual nodes 458-462. Thus, if each of the nodes includes 1 TB of RAM, the operating system will have as a view that it is running on a hardware platform that includes 3 TB of RAM. Other resources, such as processing power, and I/O resources can similarly be collectively made available to the operating system's view.

Figure 5:
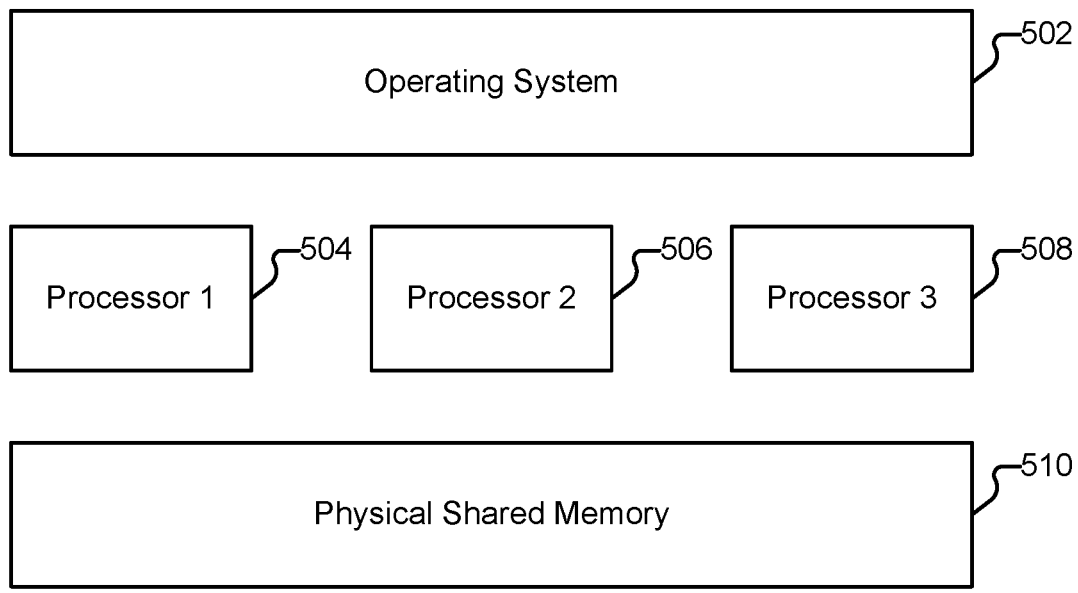
FIG. 5 depicts an example of an operating system's view of hardware on an example system.

FIG. 5 depicts an example of an operating system's view of hardware on an example system. Specifically, operating system (502) runs on top of processors 504-508 and physical shared memory 510. As explained above, an operating system can run on either a traditional computing system or on an enterprise supercomputer such as is shown in FIG. 1. In either case, the view of the operating system will be that it has access to processors 504-508 and physical shared memory 510.

Figure 6A:
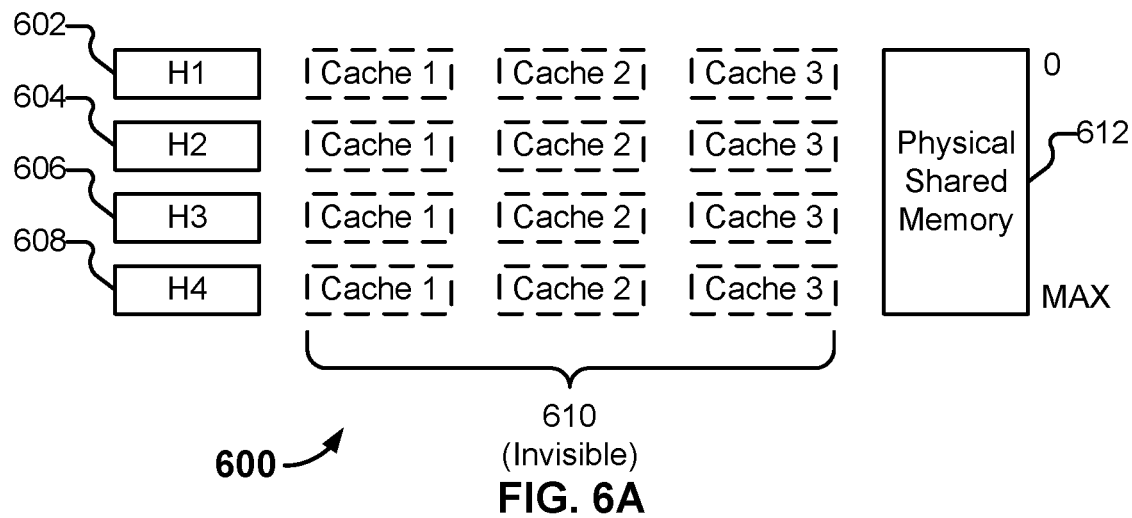
FIG. 6A depicts an example of a hyperthread's view of hardware on a single node.

FIG. 6A depicts an example of a hyperthread's view of hardware on a single node. In this example, a node has four hyperthreads denoted H1 (602) through H4 (608). Each hyperthread can access all portions of physical shared memory 612. Physical shared memory 612 is linear, labeled location 0 through a maximum amount, "max." The node also includes three levels of cache (610).

Figure 6B:
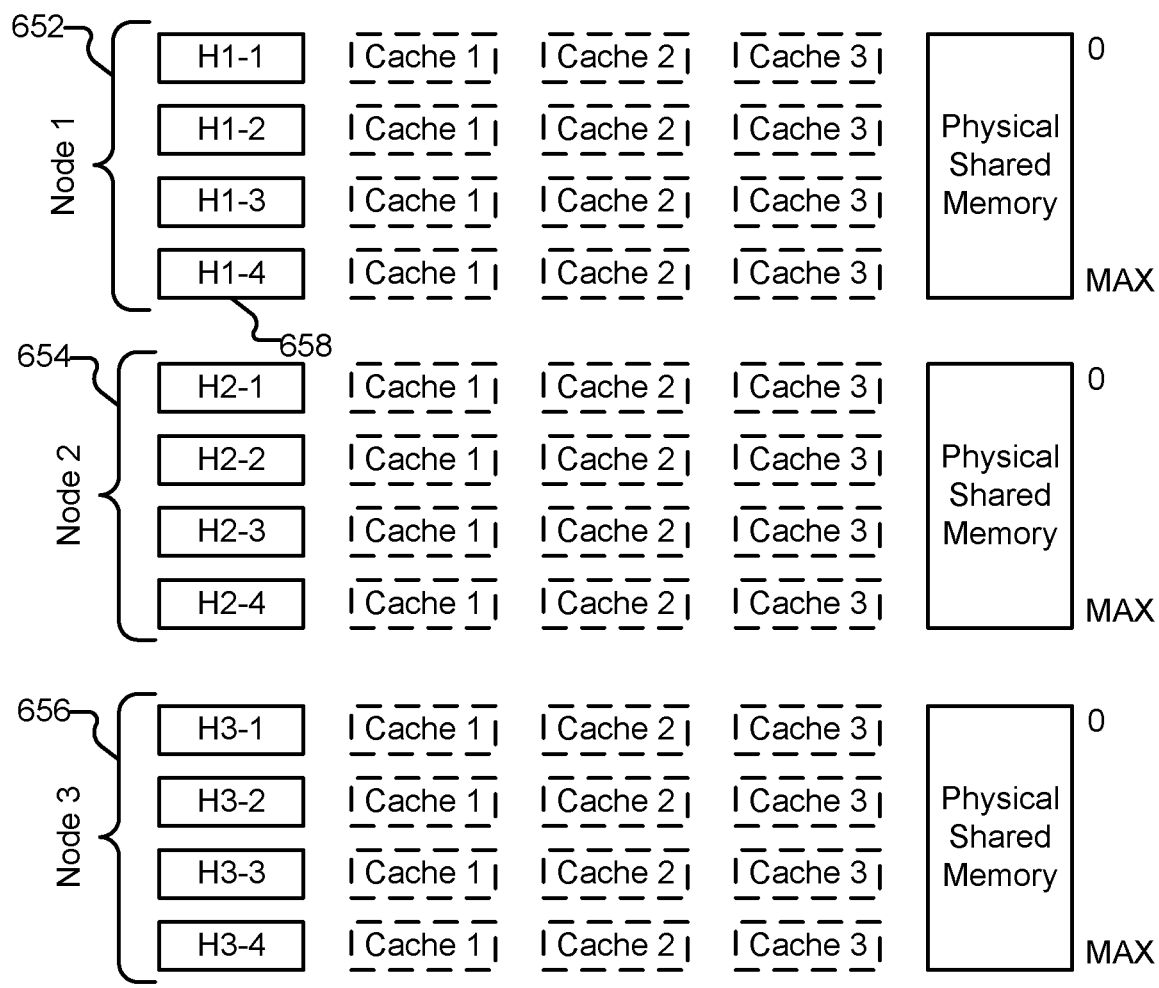
FIG. 6B depicts an example of a hyper-kernel's view of hardware on an example system.

FIG. 6B depicts an example of a hyper-kernel's view of hardware on an example system. In this example, three nodes (652-656) are included in an enterprise supercomputer. Each of the three nodes has four hyperthreads, a physical shared memory, and cache (i.e., each node is an embodiment of node 600 shown in FIG. 6A). A hyperthread on a given node (e.g., node 652) has a view that is the same as that shown in FIG. 6A. However, the hyper-kernel is aware of all of the resources on all of the nodes (i.e., the hyper-kernel sees twelve hyperthreads, and all of the physical shared memory). In the example shown in FIG. 6B, a given hyperthread (e.g., hyperthread 658, "H1-4") is labeled with its node number (e.g., "1") followed by a hyperthread number (e.g., "4").

Figure 7:
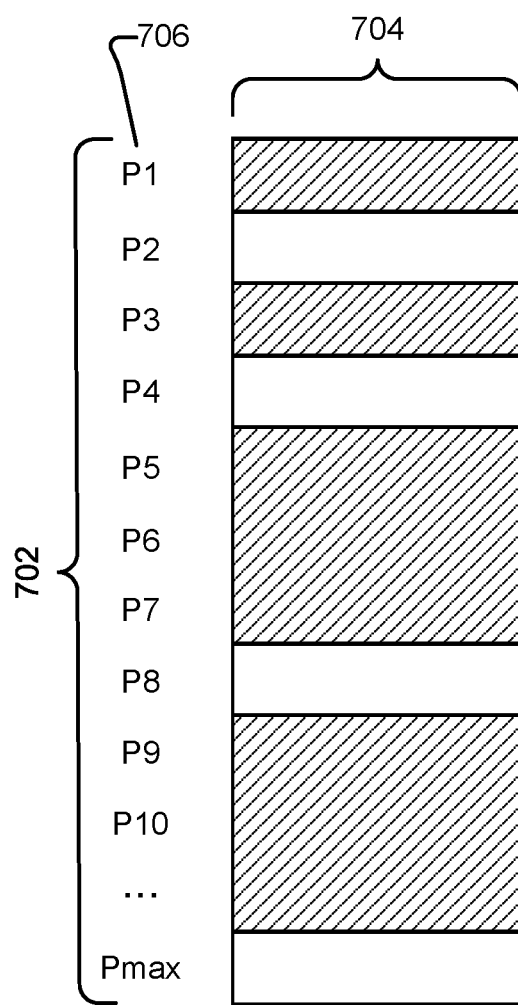
FIG. 7 depicts an example of an operating system's view of hardware on an example of an enterprise supercomputer system.

FIG. 7 depicts an example of an operating system's view of hardware on an example of an enterprise supercomputer system. The operating system sees a plurality of "virtualized processors" (also referred to herein as "virtual processors" and "VCPUs") denoted in FIG. 7 as P1 through Pmax (702). The virtualized processors correspond to the total number of hyperthreads across all nodes included in the enterprise supercomputer. Thus, using the example of FIG. 6B, if a total of twelve hyperthreads are present across three nodes, a total of twelve virtualized processors would be visible to an operating system running on the enterprise supercomputer. The operating system also sees "virtualized physical memory" (704) that appears to be a large, physical, linear memory of a size equal to the total amount of physical memory across all nodes.

As will be described in more detail below, the hyperkernel dynamically optimizes the use of cache memory and virtual processor placement based on its observations of the system as it is running. A "virtual processor" is a computing engine known to its guest operating system, i.e., one that has some operating system context or state. As will be described in more detail below, the hyper-kernel dynamically optimizes the use of cache memory and virtual processor placement based on its observations of the system as it is running. A "virtual processor" is a computing engine known to its guest operating system, i.e., one that has some operating system context or state.

Resource Virtualization

Memory Virtualization

As explained above, in the physical configuration, each node has an array of memory addresses representing locations in memory. As such, in a physical configuration with three nodes (e.g., as depicted in FIG. 6B), there are three memory locations each of which has address 0x123456. In contrast, in the virtual configuration, all memory addresses are unique and represent the sum total of all memory contained in those three nodes. In the virtual configuration, all memory is shared, and all memory caches are coherent. In some embodiments, memory is further subdivided into a series of contiguous blocks, with monotonically increasing memory addresses. In the examples described herein, each page has 4K bytes of memory, however, other subdivisions can also be used, as applicable. The term "blocks" is used herein to describe contiguous arrays of memory locations. In some embodiments, the "blocks" are "pages."

Processor Virtualization

A virtual processor (e.g., virtual processor 706 of FIG. 7), as seen by the operating system, is implemented on a hyperthread in the physical configuration, but can be location independent. Thus, while the operating system thinks it has 500 processors running on a single physical server, in actuality it might have 5 nodes of 100 processors each. (Or, as is shown in FIG. 6B, the operating system will think it has twelve processors running on a single physical server.) The computation running on a virtual processor is described either by the physical configuration on a hyperthread when the computation is running, or in a "continuation," when the virtual processor is not running (i.e., the state of an interrupted or stalled computation).

As used herein, a "continuation" represents the state of a virtual processor. Each continuation:

Has processor state (i.e., saved registers, etc.).

Has a set of performance indicators that guide a scheduler object with information about how to intelligently assign continuations to leaf nodes (e.g., hyperthreads) for execution.

Has a virtual-processor identifier that indicates the processor the operating system thinks is the physical processor to which this continuation is assigned.

Has an event on which this continuation is waiting (possibly empty).

Has a state which includes: "waiting-for-event" or "ready."

I/O Virtualization

I/O systems observe a similar paradigm to processors and memory. Devices have a physical address in the physical configuration and virtual addresses in the virtual configuration. When migrating computations (described in more detail below), if for example, there are memory buffers associated with I/O operations, the I/O devices used will likely perform better if they are co-located with the memory with which they are associated, and can be moved accordingly.

Resource Maps

Resource maps are used to translate between virtual and physical configurations. The following are three types of resource maps used by enterprise supercomputers in various embodiments.

A "physical resource map" is a table that describes the physical resources that are available on each node. It contains, for example, the number and type of the processors on each node, the devices, the memory available and its range of physical addresses, etc. In some embodiments, this table is read-only and is fixed at boot time.

An "initial virtual resource map" is fixed prior to the booting of the operating system and describes the virtual resources that are available from the point of view of the operating system. The configuration is readable by the operating system. In some cases, it may be desirable to configure a system (from the viewpoint of the operating system) that does not match, one-to-one, with the underlying hardware resources. As one example, it may be desirable for the operating system to have more memory and fewer cores. This can be accomplished by changing the ratio of memory to cores, i.e., by modifying the initial virtual resource map.

A "current resource map" is created and maintained by each hyper-kernel instance. This map describes the current mapping between the virtual resource map and the physical resource map from the point of view of each node. For each entry in the virtual resource map, a definition of the physical resources currently assigned to the virtual resources is maintained. Initially (e.g., at boot time), the current resource map is a copy of the initial virtual resource map. The hyper-kernel modifies the current resource map over time as it observes the characteristics of the resource load and dynamically changes the mapping of physical resources to virtual resources (and vice-versa). For example, the definition of the location of the Ethernet controller eth27 in the virtualized machine may at different times refer to different hardware controllers. The current resource map is used by the hyper-kernel to dynamically modify the virtual hardware resource mappings, such as the virtual memory subsystem, as required.

Resource Migration Overview

Using the techniques described herein, virtualized resources, such as virtual general-purpose processors, virtual memory, virtual networks, and virtual disks can be migrated between physical locations. Virtual interrupts may also be remotely delivered. As explained above, the operating system is provided with information about the virtualized system, but that information need not agree with the physical system. As long as the basic hardware abstractions expected by the operating system are not violated, a virtual machine may look to the operating system just like a physical machine.

As described above, in the example software-defined server described herein, there is an identical instance of the hyper-kernel running on each node of the cluster that the virtual machine spans.

Due to physical hardware boundaries, a physical processor cannot directly address every guest physical address. When a guest physical address needs to be read or written, it is translated into a physical address that the physical processor can access.

In one embodiment, this is handled through the physical processor's second level page tables. When software makes a reference to a guest (virtual) physical address, if the page of memory containing that address is resident on the node that has the processor that generated that address, the address is represented in the second level page table. Automatic address translation hardware will then translate that address to a guest physical address and then to a real physical address as it normally does by using the first and second level page tables, with no performance degradation. However, if the memory address is not present in the second level page table, the hardware cannot completely translate that guest address to a real physical address, and the processor generates an interrupt. The hyper-kernel fields that interrupt and analyzes the request (similar to what an operating system might do when it needs to copy a page that is not memory-resident but is only resident on a backing store). This analysis may result in a request for that page to be sent (migrated) to the node from a different node, or it may result in a decision to migrate that virtual processor to the node that has that page of memory. Page reads and writes may be handled differently. For example, readable pages may be replicated, but a writable page requires additional overhead to remove that page from the L4 cache of other nodes that may have a copy (i.e., invalidation).

In one embodiment, to migrate a virtual processor, the hyper-kernel takes a snapshot of the state of the processor (e.g., a continuation, using 6400 bytes of data, or any other amount as appropriate) and sends it in a message over the dedicated interconnect (e.g., Ethernet) to the chosen destination, where the suspended virtual processor may be restored onto another physical processor (e.g., implemented as a hyperthread of a processor core) at the destination node. Saving and restoring processor state may be implemented using mechanisms provided for processors supporting virtualization. Since the program counter has not advanced, the instruction is then restarted. Since the page and the virtual processor are now co-resident, the virtual processor continues running. It is possible that in some cases the instruction generates additional interrupts to access different non-resident pages, but the mechanism that is used may be the same. When the virtual processor migrates, its updated location is recorded (e.g., in the resource maps described above). However, for reliability, perfect location knowledge is not assumed, as the virtual processor may have subsequently re-migrated.

In the following example of resource migration, suppose an enterprise supercomputer holds a large in-memory database, larger than can fit into a single node. Part of the database is in a first node, "node1." Suppose one of the cores on a different node, "node2," is trying to access data that is owned by node1 and that does not reside locally in a cache on node2. The core on node2 will receive a memory access violation because it is trying to access data that it believes it should be able to access (but cannot). As will be described in more detail below, the exception is handled in the hyper-kernel.

One way that the situation can be resolved is by moving the needed area of memory to node2, and then returning control back to the operating system (which, in turn, returns it back to the database system). The software can then proceed as intended (i.e., as if the access violation never occurred).

In many cases, there may be one or more other cores in other nodes (e.g., "node3") that are also trying to access the same area block of memory as needed by node2 above. Node3 might be attempting to access the same data, or it might be accessing different data contained in the memory that was moved (also referred to as "false sharing"). The data could be moved to node3, but if the core on node2 asks for the data a second time, the data would need to be moved back to node2 (i.e., potentially moving the data back and forth repeatedly), which can be slow and wasteful. One way to avoid moving data back and forth between cores is to recognize that both cores and the associated block of data should be co-located. Using the techniques described herein, the memory and the computation can be migrated so that they reside on the same node. Doing so will result in a higher likelihood of faster access to data, and a higher probability of sharing data stored in local caches.

When the access violation occurs, an event is triggered (in a system dependent way) to which the hyper-kernel responds. One example of how such an event can be handled is by the invocation of a panic routine. Other approaches can also be used, as applicable. As will be described in more detail below, the hyper-kernel examines the cause of the event and determines an appropriate strategy (e.g., low level transaction) for handling the event. As explained above, one way to handle the event is for one or more blocks of hyper-kernel virtualized memory to be transferred from one node's memory to another node's memory. The transfer would then be initiated, and the corresponding resource maps would be updated. A continuation would be built poised to be placed in a local table in shared memory, referred to herein as an "event table," so that the next thing the continuation does when it is resumed would be to return control to the operating system after the transfer is completed. Alternatively, a decision could be made to move the virtual processor to the node that contains the memory being requested or to move the virtualized memory (and its virtualized memory address) from one node to another. Different decisions for how to handle the stall may be based on the characteristics or context or cause of the stalling event. In various embodiments, the hyper-kernel makes three decisions when handling an event: which (virtual) resources should move, when to move them, and to where (in terms of physical locations) they should move.

Guest Thread Overview

In the above, various embodiments were described in which it is shown how to create, manage, and optimize an instance of a virtual server (or computer) which is distributed over a tightly interconnected set of physical servers (or computers).

In order to make such a system run efficiently, sets of guest physical processors (virtualized processors) are associated with sets of virtual pages of memory (guest pages of memory which the guest operating system believes to be physical pages), so that they may be co-located across a set of computers (e.g., nodes in a cluster). When co-located, virtualization hardware in microprocessors may be used to achieve a performance level consistent with hardware-based non-virtualized servers.

The pattern of page accesses by VCPUs to sets of guest physical memory pages is defined by a combination of the application programs, operating system, networks, real time events, I/O devices, etc., and does not substantially change if executed on a virtualized server.

Modern operating systems such as Linux, FreeBSD, Windows, and Mac OS provide a set of features to implement asynchronous control structures referred to as "threads." Threads are software structures and mechanisms in an operating system or a run-time library (or both) that allow for asynchronous and parallel program behavior, often including responses to asynchronous events. Threads allow sub-programs to run different streams of instructions with different patterns of data access at different times. In the examples described herein, threads may be bound to a set of virtual processors under control of a scheduler running in a guest operating system. At any given point in time, a thread (e.g., guest thread associated with an application running on the guest operating system) is running on a VCPU or not running at all. At a later time, the scheduler may decide to run the thread on what it believes to be a different physical processor (which is in fact, a different virtual processor).

As described above, VCPUs in a virtualized environment may be bound to true (also called "host") physical processors through the implementation of the virtual machine and the virtual machine's scheduler (which may be different from the guest operating system scheduler).

Modern operating systems and hardware may often provide information to the hardware or the virtualization system about which thread is running in which VCPU at any given point in time, directly or indirectly.

An assumption is made by an operating system that it has direct and fast access to all resources (e.g., memory, I/O, networks, etc.) of the system. In a single virtual machine spanning a set of nodes built using the techniques described herein, this assumption is semantically preserved, but the physical realization may not be true. For example, there may be virtual processors (or threads) accessing non-local resources, where this non-local access is neither direct nor fast. As described above, when the virtualization system observes an event generated by the guest that is not physically realizable, a stall is generated. The virtualization system operates to correct or otherwise address the situation that caused the stall to bring it in line with the semantic behavior expected by the guest (application or operating system). The performance of the virtualized system is governed by the base performance of the guest operating system or application, but may be degraded by the number of stalls, and the total time taken to make the stall semantically accurate.

The pattern of access of virtual processors and sets of memory pages is in actuality determined by a guest thread running in a virtual processor under the control of a guest operating system scheduler. That is, when a virtual processor stalls, it is due to a portion of memory, referenced by the thread running in the VCPU, being inaccessible. Guest threads may run in different virtual processors, and hence host physical processors, at different times. VCPUs, and hence host physical processors, may run the same guest thread at different points in time.

The binding of threads to host physical processors depends on a variety of factors, which may include the programmed behavior of the guest scheduler, computations performed by the thread, a pattern of external asynchronous events (such as the arrival of a network packet), arrival of an I/O interrupt, etc. These events, and therefore the pattern of event arrival and the binding of the guest thread to a guest physical processor, may not be predictable in advance. Thus the actual behavior of the system may be non-deterministic, even if the program running is deterministic.

It may not be known by the hyper-kernel a priori which thread is running in which VCPU by inspection of the thread, since this is under the control of the guest operating system or a guest runtime library. For example, as will be described in further detail below, the guest operating system may perform thread context switching, where the operating system switches, moves, or multiplexes guest threads into different VCPUs. When the switch occurs, because the guest operating system doesn't know about the hyper-kernel, this may cause the thread to be moved away from its working set, resulting in stalls.

As will be described in further detail below, using the entanglement technique described herein, threads may be kept together along with the appropriate set of pages of virtual memory (guest physical memory), also referred to as the thread's "working set," on the same node, as much as possible. By doing so, number and frequency of stalls due to non-local access may be reduced, and a performance level comparable to a real physical computer may be achieved. Further, the overhead (e.g., the product of the number of stalls and the average time per stall) may be reduced. This may be achieved by intelligently placing pages and threads where they will most likely not stall. The number of page transfers and page migrations may also be minimized.

Spoilers Overview

As referred to herein, spoilers refer to guest pages in the cluster (e.g., in the software-defined server) that are frequently updated. The spoilers may include highly contended pages that are accessed or updated by multiple sources (e.g., by multiple guest threads) across the cluster. In one embodiment, spoilers are a special case of threads accessing pages that cause a large amount of page and VCPU thrashing across a cluster. The thrashing or "ping-ponging" of a resource refers to a problematic scenario in which the resource is frequently traveling between two or more nodes. For example, ping-ponging is a behavior that may be observed in threads and pages bouncing between nodes.

Examples of spoilers are pages in the guest operating system that are updated every time a system call is made. System calls may be made from any node in the cluster, and the page containing the location to be updated will be needed by VCPUs on all the nodes in the cluster. If such a page is not handled properly, many stalls will occur for the page, and may cause the page to frequently migrate across the cluster (a form of page contention). One example of a spoiler page in the kernel of the guest operating system is one that contains timers. Such pages with timers are updated very frequently (e.g., on every system call), and if not handled properly, will be ping-ponged all over a cluster and cause numerous stalls. In one example implementation of a Linux system, it may be observed that a very small number of spoiler pages account for 50% of stalls. A single page may include multiple spoilers. Described below are techniques for identifying spoilers.

Identifying Spoilers

In one embodiment, the guest OS is configured to indicate to the hypervisor (hyper-kernel) which pages are spoilers, which may be performed either directly or indirectly. Many pages in the guest OS may be identified as spoiler pages by what state the guest VCPU is in when it attempts to access the page, others may be named/identified via a hypercall (i.e. an explicit invocation of a hyper-kernel function by a guest OS), if the guest OS is modifiable.

In another embodiment, spoiler pages are classified implicitly by using, for example, a machine learning technique. Both a sampling method and a write-tracking mechanism that detect some of the most frequently written pages may be used. Spoiler pages may be detected by a filter that observes stalls on all pages, classifying pages by a combination of frequency of write access and diversity of threads accessing them. For example, the hyper-kernel is configured to track the number of times stalls (e.g., write access stalls) occur (over a period of time) on guest physical addresses, as well as the number of threads that are accessing the page. If the frequency of write stalls exceeds a frequency threshold, then the page is identified as a spoiler. Pages may be undesignated as spoilers if their observed frequency of write access/page update drops below the threshold. As another example, a list of the top N (e.g., top 25) or top M percentage (e.g., top 1%) of pages in the system by frequency of write access is maintained. Pages in the list are identified as spoilers (where pages may move in and out of the list as their observed frequency of access changes). Further details regarding identification of spoilers will be described below.

Tracked page updates/accesses may be subdivided into two types: very high frequency, and a lower level of high frequency. In some example implementations, the most frequent page updates are typically observed to occur when synchronization is occurring in the guest operating system itself. The lower frequency pattern may be observed to occur when an application is divided into concurrent threads which share user level guest pages. Those pages that are observed to have the high frequency pattern are labeled as spoiler pages, while those pages with the lower frequency pattern are labeled as non-spoilers (even while still having some observed history of page contention). The classification of different levels/types of page updates allows for the separation of two cases of page types (spoiler vs. non-spoiler), as well as the ability to specially treat spoilers, which while may be few in number in the cluster, may cause an outsize impact on stalls.

Thus, as described above, frequently accessed or updated pages may be identified as spoilers. As will be described in further detail below, this allows stalls on spoiler pages to be specially handled (e.g., using the entanglement mechanism described herein) to optimize page migration within the cluster and to reduce stalls.

Entanglement

In a system including a cluster of nodes, such as a software-defined server described above, virtualized resources such as virtualized pages of memory and virtualized processors may be migrated among the nodes of the cluster. The migration may be performed, for example, to handle stalling events when VCPUs and the portions of memory that they need are not collocated (i.e., they are on different nodes of the cluster). As described above, the VCPUs (and by extension, the threads in the VCPUs that need to access the page on which the stalling event occurred) and/or pages of memory may be migrated so that they are collocated together so that improved program execution may resume.

Which strategy or approach to take (e.g., whether to migrate a page of memory, migrate a VCPU, or some other action) to resolve a stall may depend on evaluation of various factors or conditions associated with the stall. For example, in some situations, even if a page of memory (that a stall occurred on) could be migrated, it may be beneficial for the page of memory to stay on the node that it is currently on, because of other usage of that memory. As another example, in some situations, it may be more beneficial if a guest thread running on a VCPU were to spend as much time as possible on a certain node in the cluster, and so the decision of whether to migrate a VCPU (which executes the thread) may be based on how to ensure that the thread continues to run on that node.

Described herein is a technique referred to herein as "entanglement," which, as used herein, refers to a tight coupling between one or more pages and one or more threads to a node (in a cluster of nodes). Such entanglement may be used, for example, to drive guest thread placement to maintain the tight coupling.

In some embodiments, entanglement of a thread is performed by proxy—that is, for example, by entangling certain pages to a node that will force behaviors that cause the thread to stay at that node. The entanglement mechanism described herein may be used to control the movement of resources/computing entities such as pages of memories and threads in a multi-node computer system such as the software-defined server described above. For example, using the entanglement mechanism described herein, stalls may be handled in a manner that ensures that certain pages and/or threads, if designated as entangled to a node, remain stuck with that node.

Embodiments of processes for identifying pages that should be designated as entangled, designating such pages as entangled, and handling of stalls on pages designated as entangled in order to maintain the entanglement of pages and/or threads to nodes will be described in further detail below. For illustrative purposes, described are two examples of problematic scenarios in a distributed system (such as software-defined server 100 of FIG. 1) that are addressed by the entanglement mechanism described herein, where the entanglement mechanism may be used, for example, to minimize the impact of the motion of virtual processors back and forth across nodes. The entanglement mechanism described herein may be variously adapted to improve the performance of other types of distributed systems (that may be distributed across a cluster of nodes) in which it would be beneficial to co-locate processing and data elements.

Spoilers—Entangling Pages Frequently Accessed by Many Threads

As described above, spoilers include guest pages that are frequently written by many guest threads. Such pages include pages containing locks or locked data structures coordinating thread operations, as well as pages containing common statistics such as counts, etc. When guest threads need to spread out across multiple nodes (as when many threads divide a problem into concurrent parts that require more VCPUs than can be (or should be) run on a node), such frequently written pages cannot be replicated, and neither can the threads all be moved to the node containing the shared writable page. In a software-defined server, spoiler pages are problematic because they may cause thrashing of pages and/or VCPUs across the cluster, which result in time spent migrating resources that is outside of the time spent in the guest operating system.

With respect to such spoiler pages frequently accessed by many threads, one solution to handle stalls on such pages is to have all of the guest threads that operate on a spoiler page be stuck on the same node. However, this may not be practical if there are multiple spoiler pages and a large amount of data that is not a part of a spoiler page.

In an alternative embodiment, it would be beneficial to leave a spoiler page at a known location, thereby leaving it stuck (i.e., entangled) to a node (i.e., the spoiler page is entangled on a particular node for a period of time). Thus, spoiler pages that are identified as frequently accessed by multiple threads are one class of pages that may be selected for designation as entangled with a node. When a stall occurs on such a spoiler page, the stall should be handled in a manner that keeps the spoiler page entangled on the node.

In one embodiment, what strategy is executed or otherwise selected when handling a stall on a spoiler page is controlled by designating or marking a spoiler page as an entangled page because it is frequently accessed by many threads. When a stall occurs on a page of memory, its designation is checked, where the designation of entanglement determines how the stall is handled. For example, as will be described in further detail below, when a stall occurs on a page designated as entangled because it is frequently accessed by many threads, an action is taken such that the thread that needs to access the spoiler page at that moment performs an interaction with the node (that the spoiler page is entangled to) that is very brief and very efficient, and minimizes disruption to the guest thread. This may include performing a temporary remote operation, where the guest thread's operation is sent to the node containing the page. The operation would then be executed on the remote node, and upon completion, the guest thread would continue on the originating node. Further details regarding temporary remote operation/execution, as well as other techniques for maintaining entanglement of a spoiler page to a node will be described in further detail below.

In order to implement the aforementioned solution to spoiler pages, spoiler pages are identified, and a low-cost technique for sending operations to the spoiler pages is implemented.

As described above, which pages are designated as spoiler pages may be learned by observing the frequency access of a page. For example, spoiler pages may be implicitly classified using a machine learning technique described above, in which sampling and write-tracking are used to detect frequently written pages. As described above, spoiler pages may be detected by a filter that observes stalls on all pages, classifying pages by a combination of frequency of write access and diversity of threads accessing them. A page that is frequently written by many guest threads (not only one guest thread) that are entangled on more than one node may be classified as a spoiler.

In other embodiments, spoiler pages to be entangled may be indicated to the hyper-kernel, either directly or indirectly, by the guest operating system (e.g., that is running collectively across the nodes of system 100). As described above, many pages in the guest operating system may be identified as spoiler pages by what state the guest VCPU is in when it attempts to access the page, while others may be named via a hypercall (if modification of the guest operating system is performed). For example, the guest operating system makes a hypercall to the hyper-kernel (hypervisor) indicating that the page that the guest operating system is currently interacting with is a spoiler page. As one example, the indication is made by the guest operating system passing a register that points to the indicated spoiler page to the hyper-kernel.

As described above, examples of such pages that may be known to the guest operating system to be frequently accessed by threads include types of pages such as locks and statistics. Thus, in one embodiment, from either user or kernel space, the kernel of the guest operating system may scan or otherwise evaluate the symbol table of the kernel and indicate which pages are spoilers. The guest kernel then makes the hypercall to the hyper-kernel which advises the hyper-kernel which pages are spoilers. In some embodiments, the hypercall is implemented via a driver that is dynamically added to the guest operating system. Hypercalls may also be executed in user space, in which case modification to the guest operating system is not needed. Another benefit is that having the guest operating system advise the hyper-kernel on which pages are spoilers reduces the time spent to dynamically learn the identity of spoilers by observing the frequency of access of pages in the system.

Once spoiler pages are identified (either learned or explicitly identified, as described above), the spoiler pages are designated as pages that should be entangled with a node (e.g., the node on which the page currently resides). In one embodiment, each page in the system includes a set of associated metadata including information describing the page. The per-page metadata may be included in a table or any other data structure as appropriate. In one embodiment, the metadata includes metadata for indicating whether the page is entangled. As one example, the metadata includes a bit that is set if the page is a page that should be entangled with the node that it is currently on. In some embodiments, designating a page as entangled further includes designating a type of the entangled page. The type of the entangled page may be used as an indication of the reason for why the page is entangled and may be used to provide further information/control on how a stall is handled. For example, a spoiler page is one type or class of page that is entangled. A flag or bit or any other indicator as appropriate may be set or otherwise included in the metadata to indicate that the entangled page is a spoiler page. As one example, the entanglement metadata for the page may be set when it is identified as a spoiler. Other types of entangled pages that may be designated or otherwise indicated are described below. The metadata used to designate a page as entangled as well as for designating the type of entangled page/reason for entanglement is collectively referred to as the "entanglement metadata" of a page.

Handling Stalls on Spoiler Pages

As described above, it might be beneficial if spoiler pages were maintained on the same node for as long as possible. As will be described in further detail, by designating spoiler pages as entangled in the manner described above, the entanglement metadata of the page may be used at stall time to determine that the page should be entangled, and an appropriate way to resolve the stall given such information may then be selected, which may include taking actions such that the thread that needs to access the spoiler page at that moment performs an interaction with the node that the spoiler page is entangled to that is very brief, very efficient, and minimizes disruption to the guest thread.

As one example, suppose that a stalling event on a portion of memory (e.g., page) occurs. An interrupt is sent. The hyper-kernel fields the interrupt and is configured to handle the stall. As part of determining an appropriate strategy to handle the stall, the hyper-kernel evaluates the characteristics of the stall, including whether the page of memory is an entangled page. This is done by accessing and evaluating the entanglement metadata described above that is associated with the page of memory on which the stall occurred. In this example, the hyper-kernel, based on an evaluation of the entanglement metadata, determines (e.g., by checking how the entanglement bits are set) that the page is an entangled page, and that the type of the entangled page is a spoiler page that is accessed by many guest threads. The hyper-kernel may then select an appropriate strategy to handle the stall now that it has been determined that the stall occurred on is a spoiler page (frequently accessed by many guest threads) that is designated as being entangled to the node that it is currently on. Since the page has been designated to be entangled with the node that it is on, an appropriate strategy is taken to ensure that the spoiler page remains on the node that it currently resides on (or if it is migrated, that it is only done so temporarily and briefly).

One example of a strategy that is taken to handle a stall if it is determined that the stall occurred on an entangled spoiler page is to migrate the VCPU to where the page is. This causes the guest thread executing in the VCPU to be co-located on the same node with the stalled page. However, this may cause disruption to the guest thread and its working set on its originating node (the node that the VCPU migrated from).

A second example of a strategy for handling the stall is to perform a remote execution. For example, this includes an abbreviated migration that includes moving the VCPU (running the accessing guest thread) to the entangled node that the stalled page is on until it finishes the smallest possible unit of work (or until the operation completes), and then having the VCPU return back to its originating node, effectively automatically "boomeranging" the VCPU to the node with the page and then back. By performing this brief excursion, the guest thread running in the VCPU will be returned back to the working set that has been groomed on the originating node.

In one optimization of this strategy, the VCPU is not sent in its entirety (that is, not all of the state of the VCPU is sent over) and then implemented on a physical processor on the node on which the page is currently on. Instead, the instruction and some necessary processor state is remotely executed on the node that has the page.

For example, in the Intel architecture, a single instruction trap may be used (e.g., monitor trap of the Intel VMX non-root mode), where a processor at the remote site (node that has the page) is controlled to execute one instruction. If the processor is put in this mode, then it is guaranteed that the processor will execute only one instruction. When that instruction is completed (e.g., a write update to the remote page is complete), then control is returned back to the remote processor (that sent the instruction) to run the VCPU that it had previously been running prior to the remote execution. That is, the "monitor trap" feature of the Intel VMX mechanism allows execution of an instruction until it completes. Even if that instruction requires accessing multiple guest pages which will stall the guest VCPU requesting additional pages, the instruction can complete on the remote node.

This may not always be optimal. For example, frequently, multiple successive accesses will be made to a spoiler page sequentially as part of a large abstract guest operation. Thus the guest thread's excursion to the spoiler node could be extended to cover a larger operation before returning to the node entangling the guest thread, reducing the number of node-to-node interactions. In one embodiment, this is implemented by allowing the guest thread to continue executing instructions on the remote node until it accesses a non-local page other than a few key "thread state pages" that are touched in every instruction (such as the guest thread's stack page, described in further detail below). Thus, multiple instructions may be executed in this manner by invoking the trap multiple times.

In this way, rather than migrating the entire VCPU and its state, only a minimal amount of information needed to execute the instruction (whose execution was stalled) is sent to the node with the stalled page, where the excursion of the VCPU for the spoiler is limited and brief. This minimizes the cost of handling the stall on the spoiler page. In some embodiments, which information is sent over for the remote execution is determined by evaluating the instruction to be executed on the stalled page and then determining which VCPU registers are needed to execute the instruction. Only those registers are sent to the remote node to facilitate remote execution of the instruction that resulted in the stall.

A third example strategy for handling the stall on the multiple-thread accessed spoiler page is to "boomerang" the page, as described above. For example, the page on which the stall occurred is sent temporarily to the node running the VCPU that is executing the thread that needs to access the page. After the instruction accessing the page is completed, and the short-term need for the page is satisfied, the page is returned back to its originating node (thereby keeping it entangled to the node, rather than migrating to a remote node).

Selecting the strategy to execute when handling the stall may be based on the cost of performing the strategy. As one example, the cost of executing a strategy is based on the amount of time it takes to perform the action (where the longer the action takes to complete, the costlier it is determined to be). For example, it may be determined that performing the temporary remote execution may be less costly than briefly migrating the page, because it takes more time (based, for example, on empirical timing measurements) to perform the page boomeranging (which may be due, for example, to having to invalidate translation lookaside buffers (TLBs) of all processors on the node that the page is on because the page is not invalidated, which is an expensive part of migrating pages among nodes due to the time spent in inter-processor interrupts).

The handling of spoiler pages may include further optimizations. As one example, after a write is completed into a spoiler page, the hyper-kernel replicates the page containing the spoiler to either all or a subset of the nodes in the cluster. For example, after the write to the spoiler page is completed, the page is marked read only. Since the page is a spoiler, it is likely that attempts to read the spoiler page will be made from many nodes in the cluster, which would result in multiple nodes individually requesting read access to the page, causing read stalls because the nodes do not have a local copy of the updated page. In order to pre-emptively reduce the occurrence of such stalls, in some embodiments, after a spoiler page has been written into, an assumption is made that VCPUs on other nodes will request to read the spoiler page. Thus, after the write of the spoiler page is completed, copies of the spoiler page are pre-emptively broadcast to the other nodes. Since other nodes will then have local copies of the page, individual requests for the page will not need to be made, thereby reducing the number of stalling events and improving the performance of the cluster. In one embodiment, a broadcast page copy operation is put on the interconnect connecting the nodes of the software-defined server's cluster. The other nodes pick up the copy of the page and place it in their respective page tables. Pre-emptive/early replication of pages results in a reduction in the stalls on spoiler pages (e.g., from as high as 50% of all stalls to less than 10% of total numbers of stalls, in some example implementations).

Thread Context Switches—Entangling a Guest Thread to a Node

As described above, guest threads define the pattern of access of pages of memory. Guest threads exhibit temporal locality, and tend to follow spatial locality in the data accessed. Thus, it is desirable that guest threads should stick to a node, to allow the data touched by a guest thread to groom itself on that node.

An operating system such as Linux will sometimes switch or multiplex threads between cpus. In the context of a software-defined server, the guest operating system switches the threads among the cpus that it believes to be physical cpus, but in actuality are virtual cpus. This thread-processor switching is referred to herein as "thread context switching."

Because VCPUs may be on any node in the system, the context switch that remaps threads and VCPUs may cause a thread to be switched onto a VCPU on a different node in the cluster than the thread had previously been on. Threads define the pattern of access to various pages, and unanticipated thread context switches can disrupt this pattern of access, causing the thread to be separated from its working set. As described above, it would be beneficial if threads were able to remain co-located for a period of time with its associated working set. Further, threads may be associated with pages of thread state, and it is desirable for the threads to be on the same node as their thread state. It would be beneficial if such thread context switches could be detected so that steps may be taken to ensure that the thread stays on the same node as long as possible to build and/or maintain the working set (despite actions taken by the guest operating system that unpredictably cause the thread to move away from its working set). The thread context switch also causes the thread to be separated from its guest thread state.

Thread context switch behavior is not easily learnable, as thread context switches may not be explicitly made by the guest operating system, with the guest operating system not providing any direct indication of the switch occurring.

Nonetheless, using the techniques described herein, such thread context switches may be detected, with the appropriate action taken to ensure that a thread remains entangled to a node, so that the thread may stay resident on a node with its thread local state and working set.

Detecting a Thread Context Switch Using Thread Private Pages

Thread context switches may be detected via a hypercall to the hyper-kernel, or via observation of an event that occurs as part of the guest thread switch in the guest operating system. As one example, changes to certain register values, such as the F S-Base0 register, are indicative of thread context switches. In some embodiments, the values in such a register are observed, and when a change is detected (e.g., due to the state of a new/different thread being loaded into the register during the context switch), a stall is invoked, such that the hyper-kernel is aware that a vcpu is running a different thread. As another example, and as will be described in further detail below, stalls on guest thread private pages may be used as proxies for detecting guest thread switching.

As one example, when a guest operating system switches threads, the thread switching is tightly controlled (e.g., a canned set of operations). While there may be no single instruction that indicates a thread switch is occurring, the thread switch itself may involve changing observable state, for example, a small number of registers (e.g., FS or CR3 that point to the address of the base of the hardware page table) that holds a guest thread's state when it is not running. After changing those base addresses, the new guest thread state is taken from that memory.

Some guest pages are accessed only by a running guest thread, and never by any other guest thread. Consequently, an access to any one of these pages indicates unambiguously that a guest thread is now running.

If such a page were entangled with a remote node, then the guest VCPU would access the page and stall. Stalls on such per-thread pages may be used to determine that a thread context switch has occurred. As will be described in further detail below, if the guest VCPU were migrated to the entangled node to execute the access, it would cause the guest thread to continue running where it last run. Thus, in one embodiment, the guest thread is effectively entangled to the node by entangling one or more of the guest thread's key OS state pages with the node with which guest thread entanglement is desired. This would force the VCPU to migrate. That is, entangling key base pages of the guest thread state in the guest results in guest thread-to-node entanglement, where such entangled pages are proxies for guest thread entanglement.

Examples of guest thread private pages that a thread needs to communicate with, and which may be tracked or otherwise marked to determine thread context switches, include the following.

Guest Thread State Pages

Threads define the pattern of access to various pages. One type of access is what an application demands. Such access may include referencing static data in a heap. The access may also include accessing a guest thread state page, which is specific to a given thread. The act of switching a thread out of a VCPU (thread context switch) causes an update to a thread state page, which is a data structure in the kernel in the guest operating system that indicates what physical processor (from the perspective of the guest operating system, where the observed physical processor is in actuality a virtual processor from the perspective of the hyper-kernel) the guest operating system believes that the thread is executing on. The guest thread state page is one example of a page that is observed by the system and is a function of the guest operating system.

Top of Stack Page

Another example type of a per-thread private page that may be observed to determine a thread context switch (if a stall occurs on such a page) is top of stack pages, which are specific to a particular thread and are a function of the processor. One processor register is a stack pointer. The stack pointer points to the top of stack, and so it therefore defines a page.

Each thread has a unique top of stack page. At any given point in time during the thread's execution, the thread is the only one that can write into the top of stack page. When the thread calls a routine, the thread pushes the return address onto the top of stack—no other thread can perform this operation. A top of stack page, such as the top of the kernel stack in Linux, which is a set of two physical pages (interrupt and non-interrupt) per thread, is constantly needed by a thread. These top of stack pages are particular to a thread, independent of which VCPU the thread is running in.

As described above, per-thread pages, such as the top of stack page and the guest thread state page, may be used as pieces of information to make assumptions about, or infer, the occurrence of thread context switching. For example, if a guest operating system switches a thread from a VCPU, then page stalls will occur on a page that is either a guest thread state page or the top of stack.

Thus, in one embodiment, it is determined that a thread context switch occurs if a stall occurs on a page that is a per-thread private page, as such a stall would not occur if the guest thread had not been switched onto a VCPU on another node.

As described above, it would be beneficial for threads to stay on a single node with its thread state (otherwise inefficient stalls would occur continuously on the per-thread pages), as this would keep a thread associated with its thread state memory. Further, entangling a thread to a node for as long as possible also allows a working set to be groomed on the node (since movement of the thread may cause the previously built up working set to be broken up as pages are migrated to the new node that the thread running in a different VCPU is now on).

If a thread context switch occurs as is described above, then the thread probably should be returned to the node it had been on prior to the thread context switch, so that it remains with the pages that it frequently accesses. Otherwise, if a thread is moved without moving the pages it is actively using, performance costs increase when trying to access these pages.

Moving the thread back to the node that it had been on prior to the thread context switch effectively keeps the thread entangled to a particular node. In one embodiment, the migration of the thread is performed by migrating the VCPU that the thread is currently on back to the node on which it's entangled. Thus, the entanglement mechanism described herein may be used to detect thread context switches and control the migration of VCPUs to the location of the memory they probably need.

The following is an example of detecting a thread context switch and using page entanglement as a proxy mechanism to keep a thread entangled to a node if a thread context switch occurs.

In one embodiment, per-thread pages such as guest thread state pages and top of stack pages are designated for entanglement. Examples of identifying such per-thread pages are as follows.

Per-thread pages may be indicated by the guest operating system. As one example, the guest operating system or the application running on the guest operating system makes a system call to a driver that indicates the page should be an entangled page and that it is a per-thread page.

As another example, the guest operating system implicitly indicates to the hyper-kernel the pages that should be/are entangled based on the guest operating system having per-thread memory. This per-thread memory mechanism (which in one embodiment is implemented by accessing memory with a base register which is used only to access per-thread memory) is observed while running the guest operating system. For example, the base register to the per-thread memory is observed to determine whether a per-thread page is being accessed (where such per-thread specific pages are selected or designated for entanglement with nodes).

Such pages are then designated as entangled, as described above (e.g., via entanglement metadata associated with the page). The type or class of entangled page (per-thread private page in this example) is also designated.

As described above, the designation of entanglement/type of entangled page is then used as a proxy to determine that a thread context switch has occurred, as well as to specify entanglement of a guest thread to a node.

For example, suppose that a stall occurs on a portion of memory that is needed by a thread executing in a virtual cpu. The entanglement metadata of the per-page metadata of the page is accessed. It is determined whether the page has been designated as entangled (e.g., by checking a first bit in the entanglement metadata). The type of the entangled page is also determined by checking the entanglement metadata (e.g., by checking a second bit in the entanglement metadata). If it is determined that the entangled page is a per-thread private page, then it is also determined that a thread context switch has occurred.

Based on the determination that the stalling event is due to a thread context switch having occurred (e.g., a write stall occurred due to an attempt to write into a page that is a guest thread state page or top of stack page), then, as described above, the strategy for handling/resolving the stall is to migrate the VCPU (that is running the thread that needed the per-thread page) to the node that the page is on (which may be determined, for example, using the resource maps described above, or, as another example, by evaluating metadata for the page that indicates the node that it is currently one). This returns the guest thread back to the node where the thread had been previously even though the VCPU has changed. The migration of the new VCPU causes the thread to be moved back to the node with its thread state and built-up working set, thereby keeping the thread entangled with that node. Moving the thread back to its previous node prior to the thread context switch also prevents pages in its working set from being dragged to the node that the thread was context switched onto, which may be costlier/more expensive as compared to migrating the VCPU. Thus, page entanglement has been used to induce guest thread-to-node stickiness. If the new VCPU and the old VCPU are on the same node, no migration due to the context switch is needed.

In some embodiments, threads may be moved to other nodes for reasons such as load balancing. The entanglement of pages can be used as a mechanism to move the group of per-thread pages along with the VCPU at once, rather than moving them over one at a time (e.g., as stalls occur on each of the pages). Rather, pages that have been designated as per-thread specific pages may be collectively moved as a batch to the new location of the moved thread.

Pages may become unentangled. For example, if a page is no longer a spoiler page (e.g., due to an observed frequency of access being lower than a threshold, or a page being observed to have a lower frequency of access compared to other pages), then it may be unentangled (e.g., by resetting entangled bits in the entanglement metadata of the per-page metadata for the page). As another example, guest thread state pages are allocated in the guest OS and may be deallocated (e.g., because the thread is destroyed). As one example of detecting allocation and deallocation events, the guest OS may be modified to send a signal to the hyper-kernel to mark and unmark such pages. Also, because spoiler pages may be dynamically detected (learned), their markings/designations may be kept alive or aged by the same mechanism. The guest OS may also be modified to indicate creation and deletion of spoiler pages.

Thus, as shown in the examples described above, by treating certain categories of pages (which may be a small subset of the overall number of pages) specially, such as spoiler pages (that are frequently accessed by many threads) and per-thread specific pages, in the manner described above (i.e., by entangling such pages with nodes, in effect, locking these pages onto certain nodes), performance of a distributed system, such as a software-defined server, may be improved.

Figure 8:
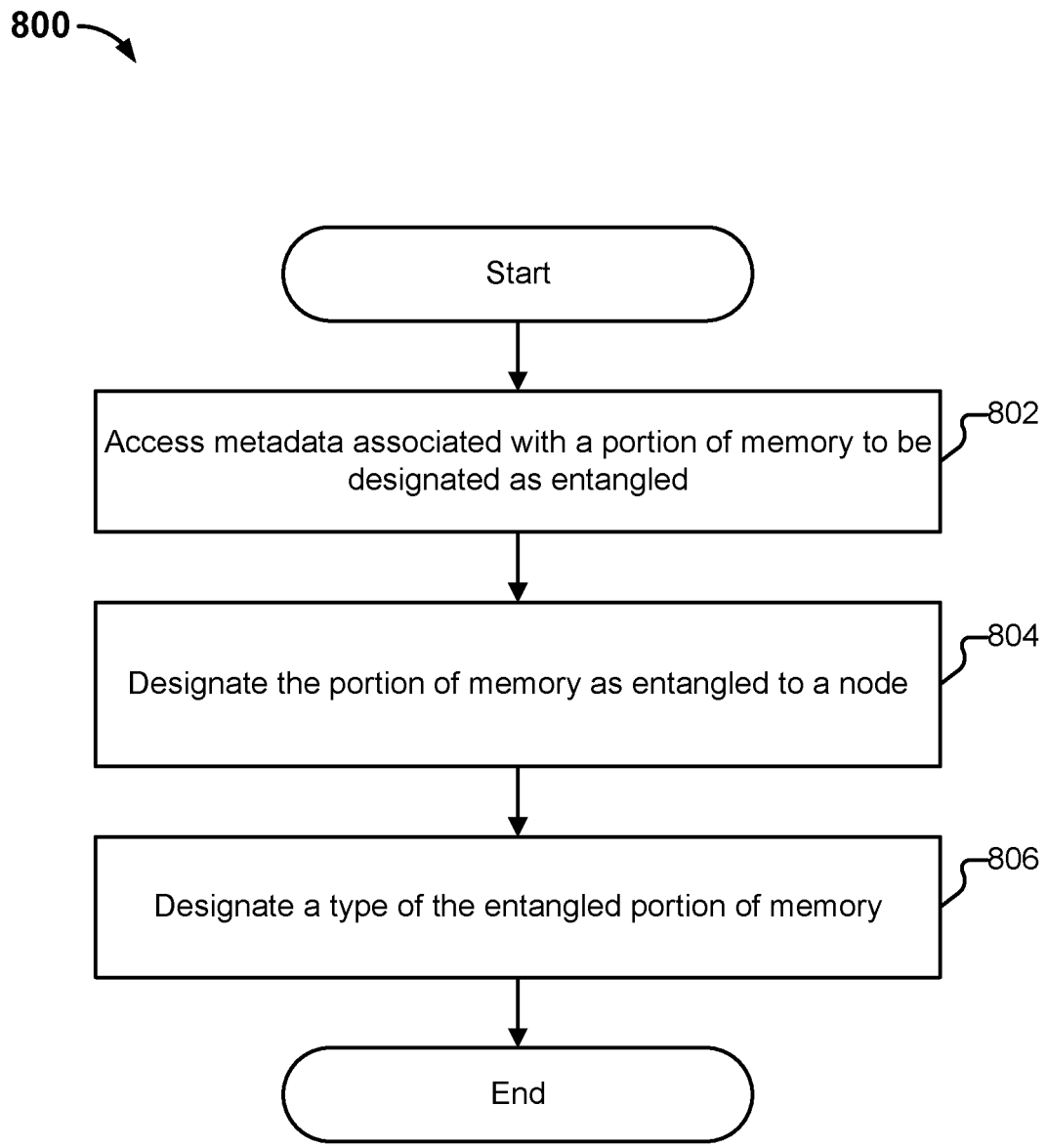
FIG. 8 is a flow diagram illustrating an embodiment of a process for designating a page as an entangled page.

FIG. 8 is a flow diagram illustrating an embodiment of a process for designating a page as an entangled page. In some embodiments, process 800 is executed by a hyper-kernel. The process begins at 802 when an indication of a portion of memory (e.g., page) to be designated as entangled to the node it is currently on is received. For example, pages such as spoiler pages and per-thread private pages, identified as described above (e.g., learned over time and/or via hypercalls), are automatically designated for entanglement. Per-page metadata associated with the page to be designated as entangled is accessed. For example, a set of entanglement bits is obtained from a table data structure including the metadata for the page. Bits are but one example of per-page entanglement metadata that may be used. Other types of metadata may be used to designate or otherwise indicate entanglement status (e.g., flags, key-value pairs, Boolean values, etc.).

At 804, the page is designated as a page that should be entangled with the node on which it currently resides. For example, a first bit in the set of entanglement bits is set to indicate that the page is entangled with the node that it is on.

At 806, a type or category or class of the entangled page is designated. For example, suppose that there are two types of entangled pages, spoiler pages and per-thread pages. A second bit in the set of entanglement bits is set to indicate the type of the entangled page. The manner in which the second bit is set indicates whether the entangled page is a spoiler page that is frequently accessed by many threads, or if the entangled page is a per-thread page (e.g., top of stack page or thread state page) that is attached to and accessed by a single, specific thread. If there are more than two types of pages, multiple bits, or any other type of metadata as appropriate, may be used to indicate the type of the entangled page. Indicating the type of entangled page also indicates a reason for entanglement (i.e., the page should be stuck to a node because it is a spoiler page that is frequently accessed by many threads, the page should be stuck to a node because it is a per-thread page that will be used as a proxy to keep a guest thread stuck to the node that the per-thread page is on, etc.).

Figure 9:
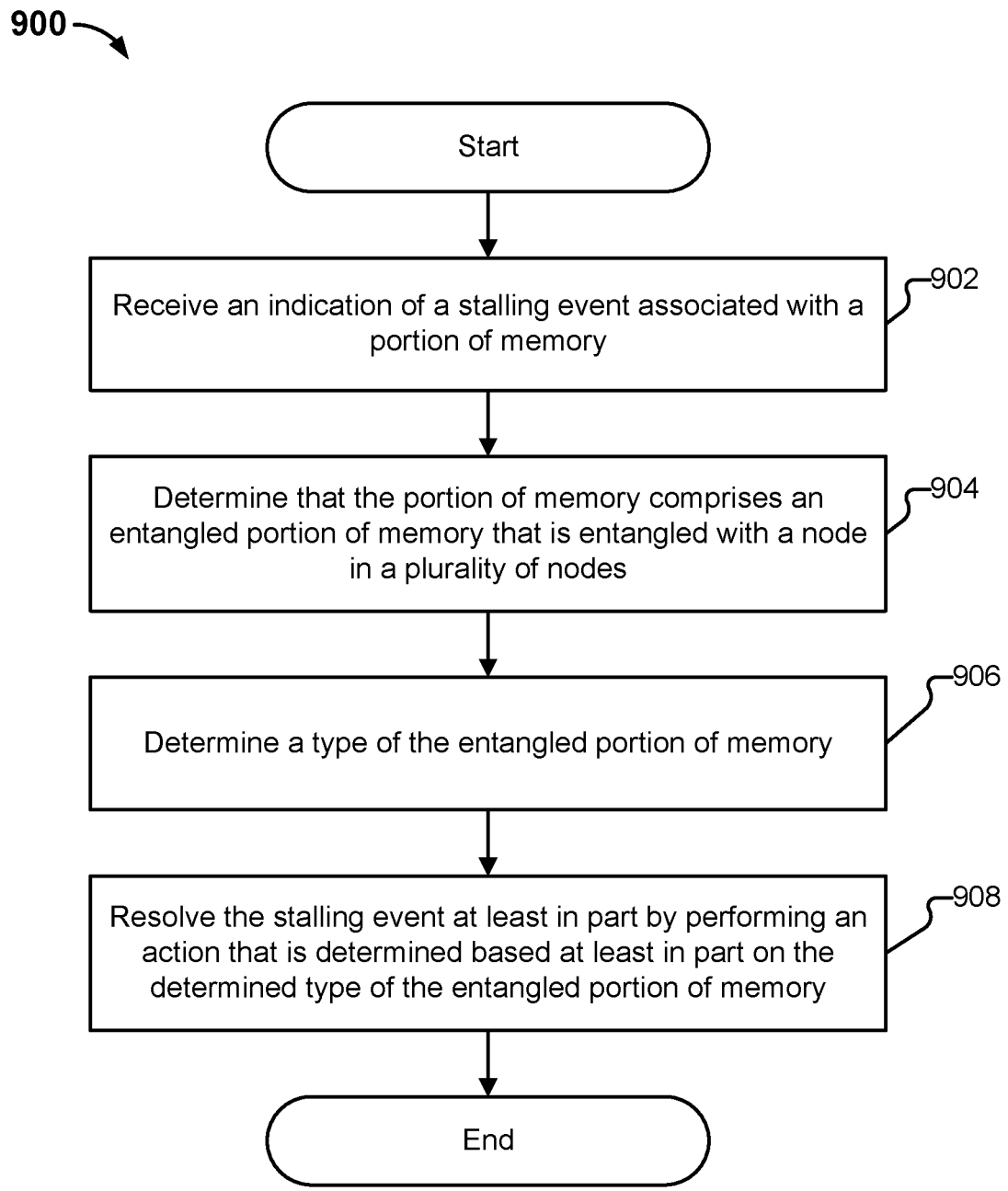
FIG. 9 is a flow diagram illustrating an embodiment of a process for handling a stall on an entangled page.

FIG. 9 is a flow diagram illustrating an embodiment of a process for handling a stall on an entangled page. In some embodiments, process 900 is executed by a hyper-kernel. The process begins at 902 when an indication of a stalling event on a portion of memory (e.g., page) is received. For example, the hyper-kernel fields an interrupt that is caused by a physical processor implementing a virtual processor (which is in turn running a guest thread) being unable to access the portion of memory.

At 904, it is determined that the portion of memory on which the stall occurred is an entangled portion of memory that is entangled to the node that the portion of memory is currently on. In one embodiment, determining that the page is entangled includes accessing a set of entanglement metadata associated with the page. For example, a set of bits in the per-page metadata is obtained. A first bit indicating whether the page is entangled is checked.

If the page is determined to not be an entangled page, then strategies for handling stalls on non-entangled pages are evaluated and/or executed. For example, cost functions may be used to determine whether to migrate the page to the node on which the virtual processor that needs the page is on, or to migrate the virtual processor to the node that the page is on. In this example, since the page is determined to be an entangled page, the process continues to 906, where the type of the entangled page is determined. In some embodiments, a second bit in the set of bits in the per-page metadata is checked to determine the type of the entangled page. At 908, based on the type of the entangled page, an action to handle or resolve the stall is performed. In some embodiments, determining the type of the entangled page includes determining whether the entangled page is a spoiler page accessed by many guest threads, or is a per-thread private page that is accessed only by a single, particular thread.

If it is determined at 906 (e.g., based on the check of the second bit) that the entangled portion of memory is a spoiler page that is frequently accessed by multiple threads, then strategies for handling stalling events due to an attempt to access an entangled spoiler page are evaluated for execution. In various embodiments, these actions may include actions that result in a temporary remote execution/operation, as described above. For example, this includes performing an abbreviated migration of the virtual processor to the node that the page is on, where upon completion of the operation, the virtual processor is returned back to its originating node. As another example, the VCPU sends a remote operation (e.g., using the monitor trap, as described above) to the node on which the entangled page is located. Another example strategy is to migrate the page to the guest thread, where upon completion of the access, the page is returned back to the node with which it is entangled.

If it is determined at 906 (e.g., based on the check of the second bit of entanglement metadata) that the entangled page is a per-guest thread page, then it is determined, for example, that a thread context switch has occurred, and strategies for handling stalling events due to thread context switches are evaluated/selected for execution. As one example, the virtual processor onto which the guest thread has been switched is migrated to the node that the entangled page is on, thereby maintaining the page on its current node, and returning the guest thread to the node that it had previously been on, prior to the thread context switch. Thus, in response to detecting the thread context switch, the hyper-kernel VCPU immediately migrates VCPU execution to the node where the guest thread was last executed (no matter on which VCPU that guest thread last executed). The node where the guest thread was last executed is the node on which the entangled per-thread page is currently on. The guest thread thereby remains associated with the node on which it had been running prior to the switch.

In one embodiment, the various candidate strategies that may be executed to handle the stall are arranged/evaluated in a hierarchical manner. As one example, the strategies are represented using polynomials or cost functions (used to determine the cost of executing a stalling strategy).

In one embodiment, the cost functions are non-linear weighted polynomials that are used for the decision making. In some embodiments, each term of a polynomial has a weight and some factor. In various embodiments, the factors correspond to pieces of hyper-kernel state, or the evaluation of a hyper-kernel function (e.g., "is the page an entangled page?"). In some embodiments, when comparing factors, each evaluates to one or zero (e.g., a binary decision, either true or false). In some embodiments, the polynomial terms include machine learning functions, where the functions are goal oriented and reinforced by earlier "correct" decisions.

In some embodiments, each term of the polynomial also has a weight, indicating the importance of that term relative to other terms in the polynomial. In some embodiments, the sum of all the weights of the polynomial adds up to 100%. For example, suppose a polynomial with three terms, where 20% of the polynomial's value is determined by the first factor, 50% is determined by the second factor, and 30% is determined by the third factor.

Based on the result of the evaluation of the polynomial, an action may be taken, or a further subset of strategies may be evaluated. For example, process 900 may be implemented as a set of polynomial strategies that are sequentially evaluated when deciding how to handle a stall. As one example, the process at step 904 may be implemented as a polynomial that checks the entanglement condition. If the polynomial evaluates to false, and the page is not an entangled page, then a first subset of strategies for handling non-entangled pages is selected for further evaluation. If, on the other hand, the page is determined to not be an entangled page, a second subset of strategy polynomials is evaluated, including, for example, a polynomial representing the check performed at 908, where it is further determined whether the entangled page is a spoiler page accessed by many threads, or a per-thread private page. If the page is determined to be a multiple-thread accessed spoiler page, then an appropriate set of strategies is selected for further evaluation. For example, as described above, the candidate strategies for handling a stall on the multiple-thread accessed page may include, as described above, actions to keep the page on the node it is currently on, including migrating the VCPU to the page, performing a minimal remote execution (e.g., boomeranging the page), and boomeranging the page to the node with the VCPU and back. As described above, each of these candidate strategies may be represented by a polynomial/cost function, which may also be used to compute a cost (e.g., performance cost) of executing the strategy. The lowest cost/highest benefit strategy may then be selected for execution. As one example, as described above, the determination of whether to perform a remote instruction execution or to boomerang the page is determined based on an amount of time taken (cost) to execute the strategy (where the more time taken to handle the stall indicates a higher cost to perform the strategy).

If the page is determined instead to be a per-thread page, then a different set of strategies is selected for further evaluation. For example, if the page is determined to be a per-thread page (indicating that a thread context switch occurred), then the strategy for handling the stall includes migrating the VCPU to the node that the per-thread page is on, as described above.

Entanglement of guest pages (and by extension, entanglement of guest threads) to nodes has been described. Such pages are writable and therefore cannot be replicated. The hyper-kernel is configured to enforce the rule that access to entangled pages is to be done on the nodes with which they are entangled.

VCPU migration between entangled node/page pairs may be done efficiently, in part because every VCPU is represented as a thread on every node.

Temporary "remote guest thread operation" of one or more instructions has also been described. Such temporary remote guest thread operation is used to handle stalls on spoiler pages (accessed by many threads), without dragging the guest thread to another node where it often will begin, almost immediately, to ungroom the data (e.g., its working set) it has groomed on its prior node.

As described above, certain pages are marked or otherwise designated as entangled with the node on which they reside. Using this mechanism, these pages will not be frequently moved. Two types of entangled pages include spoiler pages and per-thread private pages.

Whenever an entangled page is accessed by a guest VCPU and a stall occurs, the type of entangled page is determined. If it is a spoiler page, then a remote operation may be sent by the guest VCPU to the node on which the entangled page is located. If the type of the entangled page is a guest private page, then the guest VCPU is migrated to the node where the entangled page is located.

As described above, the temporary remote operations executed when handling stalls on a spoiler type entangled page may be implemented in a variety of manners. In one embodiment, the monitor trap of the Intel VMX-non-root-mode is run until one instruction is completed. In this way, the excursion of the VCPU for a spoiler is limited and brief.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a plurality of physically interconnected computing nodes comprising a first computing node and a second computing node separate from the first computing node; and
   a kernel that:
     receives an indication of a stalling event caused by the first computing node requesting access to a requested portion of memory and the requested portion of memory being inaccessible by the first computing node;
     determines that the requested portion of memory is an entangled portion of memory that is designated as being entangled with the second computing node;
     handles the stalling event, wherein the handling comprises:
       migrating the requested portion of memory to the second computing node, wherein the requested portion of memory is accessed by a virtual processor on the second computing node; and
       migrating the requested portion of memory back to the first computing node responsive to completion of the access by the virtual processor;
     determines a cost to migrate the requested portion of memory from the second computing node to the first computing node; and
     determines to migrate the requested portion of the memory to the second computing node based on the cost.

2. The system recited in claim 1, wherein the kernel determines that the entangled portion of memory is a portion of memory that is frequently accessed by a plurality of threads.

3. The system recited in claim 2, wherein the kernel, responsive to determining that the entangled portion of memory is a portion of memory that is frequently accessed by the plurality of threads, handles the stalling event.

4. The system of claim 1, wherein the kernel:
   evaluates timing measurements associated with page migration between the second computer node and the first computer node; and
   estimates the cost based on the timing measurements.

5. The system of claim 1, wherein the kernel:
   determines a frequency of write accesses by threads to the requested portion of memory;
   determines a number of the threads; and
   determines that the requested portion of memory is an entangled portion based on the number of writes and the number of threads.

6. A method, comprising:
   receiving an indication of a stalling event caused by a first computing node of a plurality of physically interconnected computing nodes requesting access to a requested portion of memory, wherein the plurality of physically interconnected computing nodes further comprises a second computing node separate from the first computing node;
   determining that the requested portion of memory is an entangled portion of memory that is designated as being entangled with the second computing node;
   handling the stalling event, wherein the handling comprises:
     migrating the requested portion of memory to the second computing node;
     accessing, by a virtual processor on the second computing node, the requested portion of memory; and
     migrating the requested portion of memory back to the first computing node responsive to completion of the access by the virtual processor;
   determining a cost to migrate the requested portion of memory from the second computing node to the first computing node; and
   determining to migrate the requested portion of the memory to the second computing node based on the cost.

7. The method of claim 6, further comprising determining that the entangled portion of memory is a portion of memory frequently accessed by a plurality of threads.

8. The method of claim 7, further comprising handling the stalling event responsive to the determination that the entangled portion of memory is a portion of memory frequently accessed by a plurality of threads.

9. The method of claim 6, wherein determining the cost comprises evaluating timing measurements associated with page migration between the second computer node and the first computer node.

10. A non-transitory computer readable storage medium that stores machine readable instructions that, when executed by a machine, cause the machine to:
   receive an indication of a stalling event caused by the first computing node requesting access to a requested portion of memory, and the request portion of memory being inaccessible by the first computing node;
   determine that the requested portion of memory is an entangled portion of memory that is designated as being entangled with a second computing node;

handle the stalling event, wherein handling the stalling event comprises:

moving a virtual processor from the first computing node to the second computing node to allow the virtual processor to execute a guest thread on the second computing node to perform the access to the requested portion of memory; and returning the virtual processor back to the first computing node responsive to completion of the access to the requested portion of memory; and determine that the requested portion of memory is an entangled portion responsive to a determination that the requested portion of memory is frequently accessed by a plurality of threads.

11. The storage medium of claim 10, wherein:

the virtual processor, when on the first computing node, has a state; and the instructions, when executed by the machine, further cause the machine to move the state in its entirety to the second computing node such that the virtual processor, when on the second computing node, has the state.

12. The storage medium of claim 10, wherein:

the virtual processor, when on the first computing node, has a state; and the instructions, when executed by the machine, further cause the machine to partially move the state in its entirety to the second computing node such that the virtual processor, when on the second computing node, has a subset of the state.

13. The storage medium of claim 10, wherein the instructions, when executed by the machine, further cause the machine to limit instruction execution by the virtual processor on the second computing node to an instruction to perform the access to the requested portion of the memory.

14. The storage medium of claim 10, wherein the instructions, when executed by the machine, further cause the machine to place the virtual processor on the second computing node in an instruction trap mode to limit instruction execution by the virtual processor on the second computing node.

15. The storage medium of claim 10, wherein the virtual processor on the first computing node has a set of registers, and the instructions, when executed by the machine, further cause the machine to further partially move the set of registers to the second computing node so that the virtual processor on the second computing node has a subset of the registers.

16. The storage medium of claim 10, wherein the instructions, when executed by the machine, further cause the machine to determine that the requested portion of memory is an entangled portion responsive to a determination that the requested portion of memory is subject to a replication restriction.

17. The storage medium of claim 10, wherein the instructions, when executed by the machine, further cause the machine to determine that the requested portion of memory is an entangled portion based on a number of writes to responsive to a number of write accesses to the requested portion of memory and a diversity of threads issuing the write accesses.

\* \* \* \* \*